United States Patent
Gómez-Ulla de Irazazábal et al.

(10) Patent No.: US 8,355,544 B2
(45) Date of Patent: Jan. 15, 2013

(54) METHOD, APPARATUS, AND SYSTEM FOR AUTOMATIC RETINAL IMAGE ANALYSIS

(75) Inventors: Francisco Gómez-Ulla de Irazazábal, A Coruña (ES); Manuel Francisco González Penedo, Santiago de Compostela (ES); Antonio Pose Reino, A Coruña (ES); Noelia Barreira Rodríguez, A Coruña (ES); Marcos Ortega Hortas, A Coruña (ES); María José Carreira Nouche, Santiago de Compostela (ES); Antonio Mosquera González, A Coruña (ES)

(73) Assignees: Universidade da Coruna-Otri, A Coruna (ES); Universidade de Santiago de Compostela, Santiago de Compostela (ES); Servicio Galego de Saude (Sergas), Santiago de Compostela (ES)

( * ) Notice: Subject to any disclaimer, the term of this patent is extended or adjusted under 35 U.S.C. 154(b) by 49 days.

(21) Appl. No.: 13/191,447

(22) Filed: Jul. 27, 2011

(65) Prior Publication Data

US 2012/0195481 A1     Aug. 2, 2012

Related U.S. Application Data

(63) Continuation-in-part of application No. 13/018,430, filed on Feb. 1, 2011.

(51) Int. Cl.
*G06K 9/00* (2006.01)
*A61B 3/14* (2006.01)

(52) U.S. Cl. .......... 382/117; 382/224; 351/209

(58) Field of Classification Search .......... 382/100, 382/103, 107, 115, 117, 128, 129, 130, 131, 382/132, 133, 134, 156, 162, 168, 173, 181, 382/224, 232, 254, 274, 276, 285–299, 305, 382/312; 351/206, 201, 209
See application file for complete search history.

(56) References Cited

U.S. PATENT DOCUMENTS

| | | | |
|---|---|---|---|
| 5,311,600 A * | 5/1994 | Aghajan et al. | 382/156 |
| 6,996,260 B1 | 2/2006 | Skands et al. | |
| 7,524,061 B2 * | 4/2009 | Yan et al. | 351/206 |

(Continued)

FOREIGN PATENT DOCUMENTS

EP     1389770     2/2004

OTHER PUBLICATIONS

M.M. Fraz et al. Blood vessel segmentation methodologies in retinal images—A survey. Computer Methods and Programs in Biomedicine 108 (2012), pp. 407-433 Elsevier Ireland Ltd.

(Continued)

*Primary Examiner* — Seyed Azarian
(74) *Attorney, Agent, or Firm* — Mateo Aboy; Aboy & Associates PC

(57) ABSTRACT

Disclosed embodiments include a method for retinal image analysis implemented in a medical system with one or more processors comprising the method steps of: (a) locating an optical disk on the retinal images and establishing a plurality of circumferences centered at the disk; (b) detecting a plurality of vessels within a region defined by said circumferences' radii using a crease-based algorithm; (c) extracting a plurality of vessel segments based on a deformable models (snakes) algorithm; and d) automatically classifying the vessels and computing clinical parameters.

13 Claims, 18 Drawing Sheets

U.S. PATENT DOCUMENTS

| | | | |
|---|---|---|---|
| 7,583,827 B2 * | 9/2009 | Hansen et al. | 382/128 |
| 7,677,729 B2 | 3/2010 | Vilser et al. | |
| 7,715,626 B2 * | 5/2010 | Florin et al. | 382/173 |
| 7,756,569 B2 | 7/2010 | Hammer et al. | |
| 7,992,999 B2 * | 8/2011 | Xu et al. | 351/206 |
| 2004/0064057 A1 | 4/2004 | Siegel | |
| 2004/0258285 A1 | 12/2004 | Hansen et al. | |
| 2006/0147095 A1 | 7/2006 | Usher et al. | |
| 2007/0019846 A1 | 1/2007 | Bullitt et al. | |
| 2007/0109499 A1 | 5/2007 | Yan et al. | |
| 2007/0244396 A1 | 10/2007 | Vilser et al. | |
| 2008/0212026 A1 | 9/2008 | Molnar et al. | |
| 2010/0104168 A1 | 4/2010 | Dobbe | |
| 2010/0290005 A1 | 11/2010 | Huang et al. | |
| 2012/0195480 A1 | 8/2012 | Gonzalez et al. | |

OTHER PUBLICATIONS

Marc Saez et al. Development of an automated system to classify retinal vessels into arteries veins. Computer Methods and Programs in Biomedicine 108 (2012), pp. 365-376 Elsevier Ireland Ltd.

M.M. Fraz et al. An approach to localize the retinal blood vessels using bit planes and centerline detection. Computer Methods and Programs in Biomedicine 108 (2012), pp. 600-616 Elsevier Ireland Ltd.

David Calvo et al. Automatic detection and characterisation of retinal vessel tree bifurcations and crossovers in eye fundus images. Computer Methods and Programs in Biomedicine 103 (2011), pp. 28-38 Elsevier Ireland Ltd.

* cited by examiner (A)

(B)

(C)

METHOD, APPARATUS, AND SYSTEM FOR AUTOMATIC RETINAL IMAGE ANALYSIS

CROSS-REFERENCE TO RELATED APPLICATIONS

This application is a Continuation-In-Part of U.S. patent application Ser. No. 13/018,430 filed on 2011 Feb. 1, which is incorporated herein by reference.

TECHNICAL FIELD

Disclosed embodiments relate to methods, apparatus, and systems for medical image analysis. Specifically, they relate to methods, apparatus, and systems for retinal image analysis.

BACKGROUND

Analysis of blood vessels from retinal images has clinical significance since retinal blood vessels are the first ones that show the symptoms of several pathologies, such as arterial hypertension, arteriosclerosis, and other systemic vascular diseases.

In order to detect such symptoms and to perform diagnosis, it is typically required to perform a series of image processing tasks. Currently available retinal analysis systems require significant manual input from the medical personnel, are subjective, and analysis is time-consuming and prone to error. Accurate, objective, reliable, and automatic (or semi-automatic) retinal image medical systems are currently not available with the performance required for routine clinical use.

As an example, the computation of the retina arteriovenous ratio (AVR), that is, the relation between afferent and efferent blood vessels of the retinal vascular tree, is significant in order to diagnose diseases and evaluate their consequences. Due to the unavailability of commercial retinal image analysis systems with precise and robust estimation of the AVR metric, analysis of the AVR is usually computed by a tedious and time consuming manual process. This the results in more expensive, subjective, and ophthalmologist-dependent AVR computations. Similarly, other clinical parameters derived from retinal image analysis are tedious and their manual computation is subjective.

Automatic retinal image analysis is an important field in order to calculate a series of biomedical parameters obtained from relevant structures in the retina. Blood vessels, i.e., arteries and veins, are among these relevant structures as their segmentation and measurement help to spot the presence of pathologies such as arterial hypertension, diabetic retinopathy, and other pathologies.

Among the many challenges related to the automatic analysis of retinal blood vessels, one of the most challenging problems to overcome is the automatic classification of said vessels into artery or vein. This is an important task in medical analysis in the automatic calculation of the AVR ratio and other similar clinical parameters. Nowadays, all the advances regarding artery/vein classification offer solutions based on manual vessel labeling, which is a tedious task for medical experts prone to high intra-expert and inter-expert variability due to factors such as exhaustion, expertise or image quality. Automatic approaches, method, or systems are not currently commercially available or disclosed in the patent literature.

SUMMARY

Disclosed embodiments include a method for analysis of retinal images implemented in a medical apparatus or system including functionality for 1) locating optical disks in retinal images, 2) detecting vessels, 3) extracting vessels, 4) measuring vessel calibers, 5) classifying vessels, and 6) computing a plurality of clinical parameters.

According to one embodiment, and without limitation, the method is implemented in a medical system with one or more processors and comprises the method steps of: (a) locating an optical disk on the retinal images and establishing a plurality of circumferences centered at the disk; (b) detecting a plurality of vessels within a region defined by said circumferences' radii using a crease-based algorithm; (c) extracting a plurality of vessel segments based on a deformable models (snakes) algorithm; (d) measuring a plurality of vessel calibers; (e) classifying each vessel as a vein and an artery; and (f) computing an arteriolar-to-venular ratio.

According to one embodiment, the method performs the all the retinal image analysis tasks automatically without requiring operators input. The method for automatic analysis of a retinal image implemented in a medical system with one or more processors comprises: (a) automatically locating an optical disk on the retinal image and establishing a plurality of circumferences centered at the disk 102; (b) automatically detecting a plurality of vessels within a region defined by said circumferences' radii using a crease-based algorithm; automatically extracting a plurality of vessel segments based on a deformable models (snakes) algorithm; and automatically classifying said plurality of vessel segments employing 1) an automatic vessel classification method to produce an initial classification, and refining the vessel classification based on a vessel tracking method.

BRIEF DESCRIPTION OF THE DRAWINGS

Disclosed embodiments are illustrated by way of example, and not by way of limitation, in the figures of the accompanying drawings.

DETAILED DESCRIPTION

Figure 1:
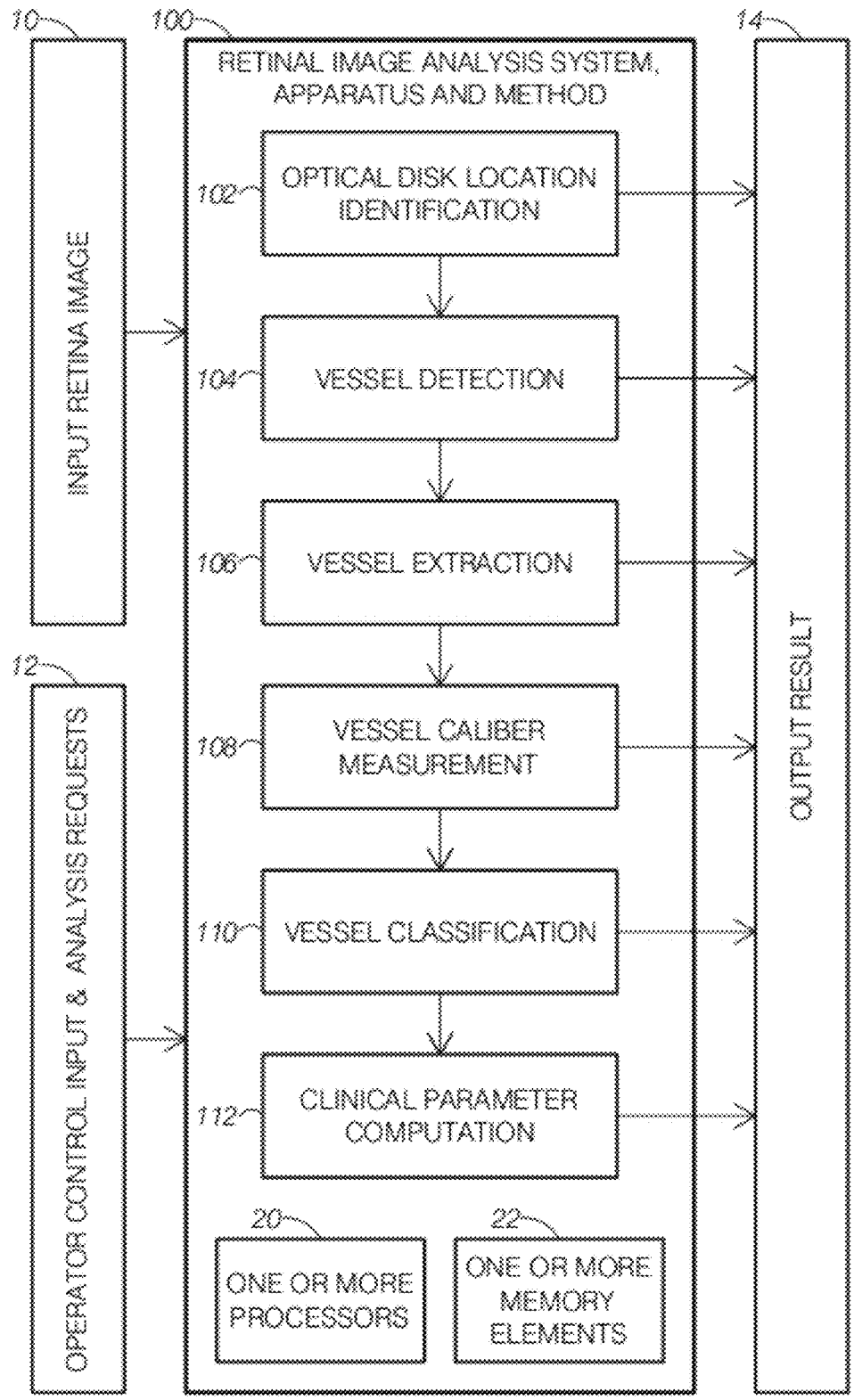
FIG. 1 shows a general block diagram of the system, apparatus, and method according to one embodiment.

As shown in FIG. 1, disclosed embodiments include a method for analysis of retinal images implemented in a medical apparatus or system with one or more processors 20 and one or more memory elements 22 in order to locate optical disks in retinal images 102, detect vessels 104, extract vessels 106, measure vessel calibers 108, classify vessels 110, and compute a plurality of clinical parameters 112. According to one embodiment, and without limitation, such clinical parameters include the computation of the arteriolar-to-venular ratio (AVR). The retinal analysis method takes a retina image 10 and the operator instructions 12 as an input and produces output result selected among the outputs of each method step.

According to one embodiment as shown in FIG. 1, and without limitation, the method is implemented in a medical system with one or more processors and comprises the method steps of: (a) locating an optical disk on the retinal images and establishing a plurality of circumferences centered at the disk 102; (b) detecting a plurality of vessels within a region defined by said circumferences' radii using a crease-based algorithm 104; (c) extracting a plurality of vessel segments based on a deformable models (snakes) algorithm 106; (d) measuring a plurality of vessel calibers 108; (e) classifying each vessel as a vein and an artery 110; and (f) computing an arteriolar-to-venular ratio 112.

Figure 2:
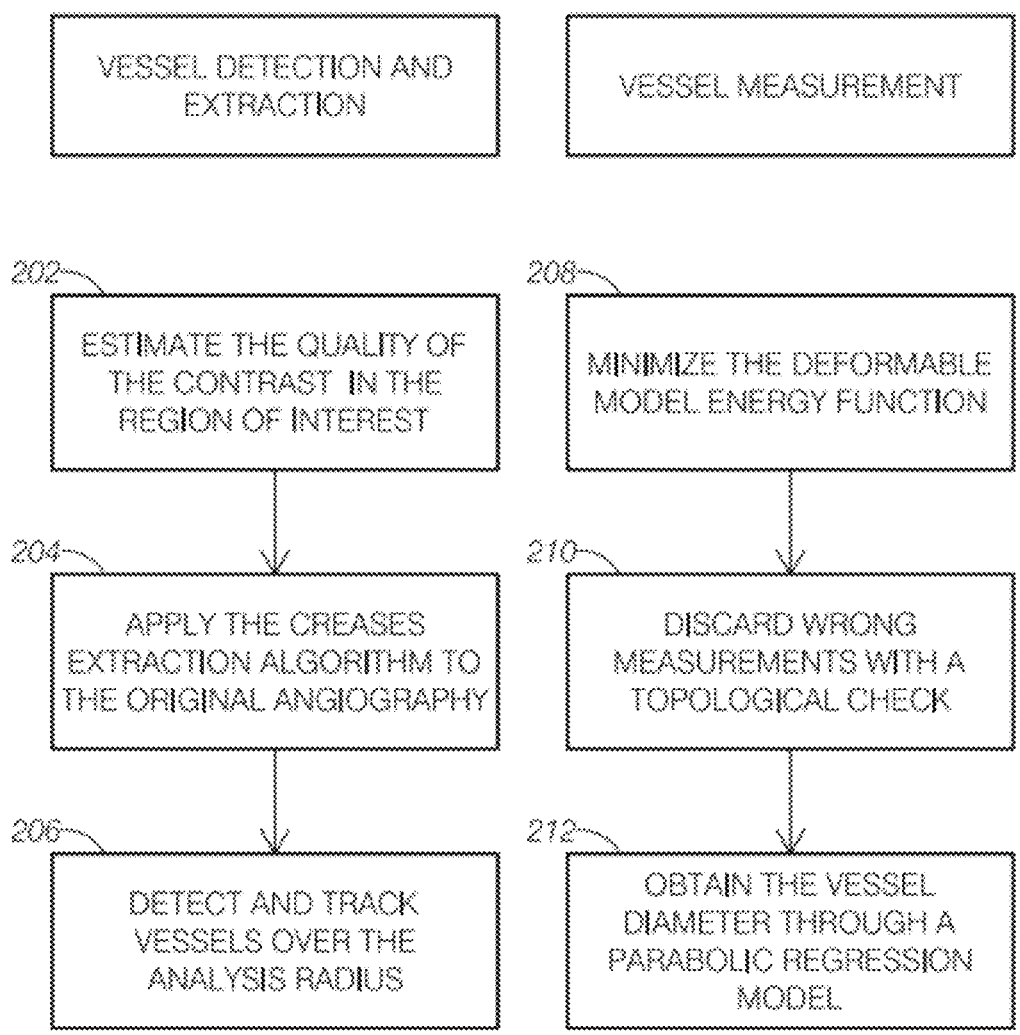
FIG. 2 shows a block diagram of the method for vessel detection and extraction, and the method for vessel measurement according to one embodiment.
Figure 3:
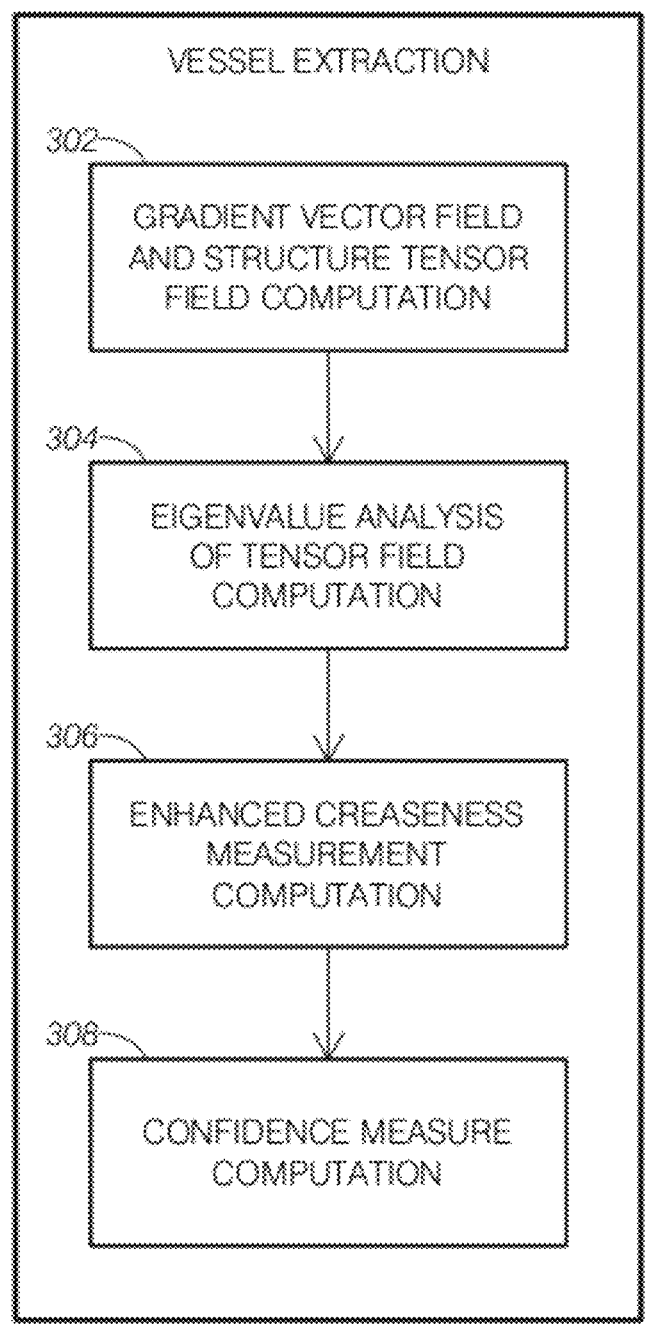
FIG. 3 shows a block diagram of a particular method for vessel extraction.

FIG. 2 shows a block diagram of the method for vessel detection and extraction, and the method for vessel measurement according to one embodiment. According to this particular embodiment, and without limitation, the vessel extraction algorithm comprises 1) estimating the quality of the contrast in the region of interest 202, 2) applying a creases extraction algorithm to the original angiography 204, and 3) detecting and tracking vessels over the analysis radius 206; and the vessel measurement algorithm comprises 1) minimizing a deformable model energy function 208, 2) discarding wrong measurements based on a topological check 210, and 3) obtaining the vessel diameter through a parabolic regression model 212. FIG. 3 shows a block diagram of a particular method for vessel extraction.

A. Locating the Optical Disk and Analysis Circumference Radius

Figure 4:
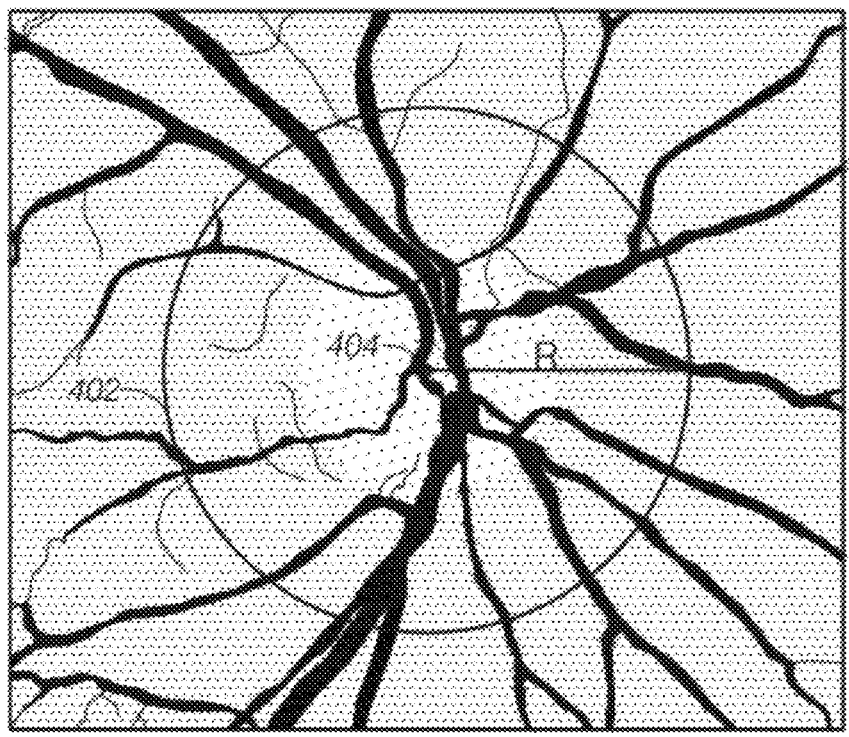
FIG. 4 shows a an example drawing to illustrate the input retinal image, the optic disk center, and the analysis circumference; as well as the linear profile gray level representation around the analysis circumference, where deeper valleys correspond to vessels.
Figure 4:
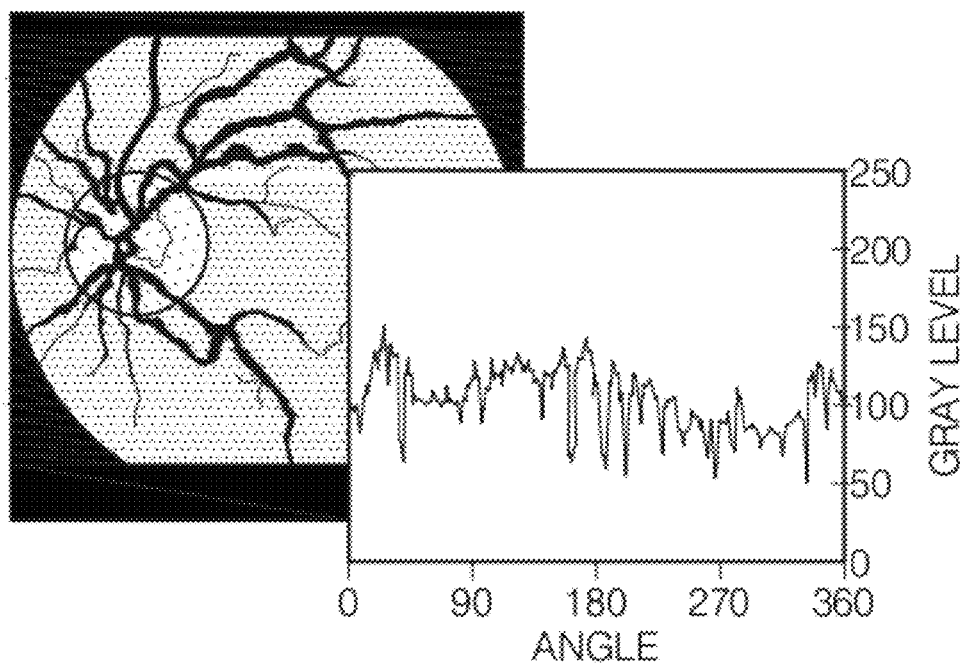

The vascular tree of the eye is inherently radial. Consequently, AVR computation involves vessels located at a concentric areas (analysis circumference) 402 around the optic disk center 404, as shown in FIG. 4.

According to one embodiment, the method includes a step to automatically locate the optical disk based on the fuzzy circular Hough transform or using active contours. In an alternative embodiment, the system is semi-automatic and allows a medical professional such as an ophthalmologist to point out the the optic disk center 404 and the analysis circumference radius. According to this embodiment, the system allows the medical expert to select the optic disk center 404 and choose the diameter and number of radial concentric circles 402. In a third embodiment, both options are available and the method can be fully automatic or semi-automatic based on the requests of the operator (i.e. based on the operator instructions 12).

B. Detecting Vessels

Figure 5:
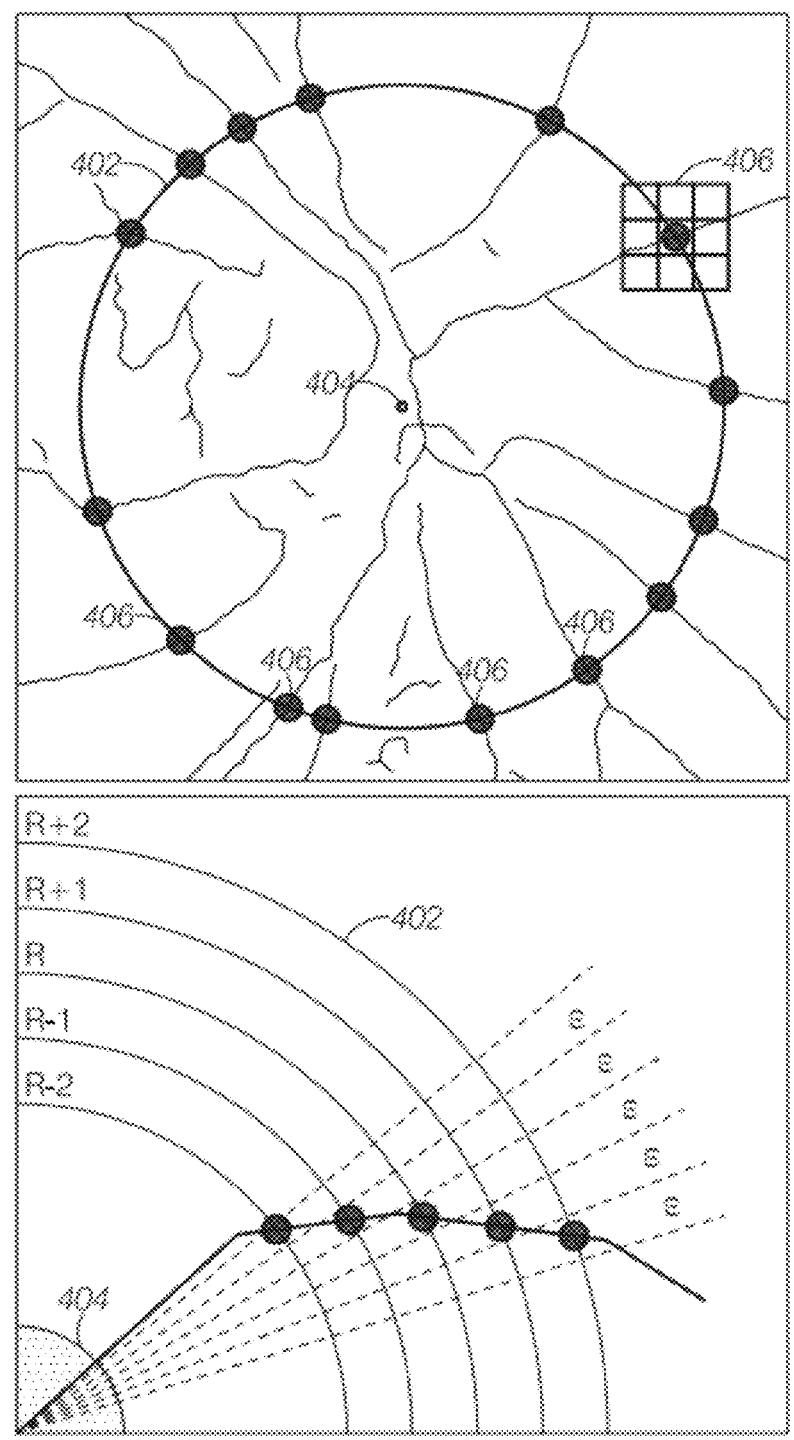
FIG. 5 shows an example to illustrate the intersections between each crease and the analysis circumference and the procedure for vessel detection through crease tracking.

According to one embodiment, as shown in FIG. 5, vessel detection 104 is based on the automatic extraction of creases, which are a fast and robust way to obtain a representation of the whole retinal vascular tree. FIG. 5 shows an example to illustrate the intersections 406 (candidate point vessels) between each crease and the analysis circumference 402 and the procedure for vessel detection through crease tracking.

A crease can be defined as a continuous zone of points on the image, shaping a highest or a lowest level in its environment. When images are seen as landscapes, blood vessels can be considered as ridges or valleys, that is, regions which form an extreme and tubular level on their neighborhood.

According to one embodiment, the method computes the creases based on a geometric based approach, the Level Set Extrinsic Curvature (LSEC). Given a function $L: \mathbb{R}^d \to \mathbb{R}$, the level set for a constant l consists of the set of points $\{x | L(x) = l\}$. For 2D images, L can be considered as a topographic relief or landscape and the level sets are its level curves. Negative minima of the level curve curvature κ, level by level, form valley curves, and positive maxima ridge curves. The 2D LSEC can be expressed in terms of the derivatives of L according to tensorial calculus as:

$$\kappa = (2 L_x L_y L_{xy} - L_y^2 L_{xx} - L_x^2 L_{yy})(L_x^2 + L_y^2)^{-3/2} \qquad (1)$$

where $$L_\alpha = \frac{\partial L}{\partial \alpha}, \ L_{\alpha\beta} = \frac{\partial^2 L}{\partial \alpha \partial \beta}, \ \alpha, \beta \in \{x, y\}$$

The LSEC approach produces a large dynamic range of values, but only a few points at the upper and lower bounds indicate curvature. In some cases, these points, called outliers, are not as centered as other points, also with a high value but not labelled as outliers. As a consequence, the computed creases are not centered in the structures. Additionally, the usual discretization of LSEC is ill-defined in an important number of cases, giving rise to unexpected discontinuities at the center of elongated objects. This is due to the very local definition of the LSEC, which is not appropriate for the discrete domain. These issues are solved through the improvement of this method by a multilocal solution, the Multi-local Level Set Extrinsic Curvature (MLSEC). The results obtained with MLSEC can be enhanced by pre-filtering the image gradient vector field using structure tensor analysis and by discarding creaseness at isotropic areas by means of the computation of a confidence measure.

In 2D, the level curve curvature κ can be defined through its geometric relationship with the slope lines, which are the lines integrating the gradient vector field w and are, therefore, orthogonal to the level curves. Due to the orthogonality, when level curves are parallel straight lines, slope lines are also parallel and straight, and when the level curves bend, the slope lines diverge/converge. This is the reason why divergence operator is used to calculate maximal/minimal curvatures of the level curves.

If we denote as $\bar{w}$ the normalized gradient vector field of L: $\mathbb{R}^d \to \mathbb{R}$, the curvature for d—dimensionality can be defined as:

$$\kappa_d = -\mathrm{div}(\bar{w}) \qquad (2)$$

In 2D (d=2), lets take the point x where the divergence of a 2D vector field u has to be computed. Let $\mathcal{C}$ be a simpled closed curve in $\mathbb{R}^2$ parameterized by l, which encloses the point x; let n be its unitary normal vector and ω the area enclosed by $\mathcal{C}$. Then the divergence of u at x can also be defined as:

$$div(u) = \lim_{\omega \to 0} \frac{1}{\omega} \int_{\mathcal{C}} u^t \cdot n \partial l \quad (3)$$

According to one embodiment, local definition of $\kappa_d$ is substituted by a multi-local definition based on a discretized version of eq. 3, where the multi-locality is achieved by assuming that a neighborhood $\mathcal{W}$ around a point x or, analogously, its closed boundary $\mathbb{R}$, is a selectable parameter. That is, to compute $div(\overline{w})$ at x the gradient vectors along the path $\mathbb{R}$ around the point x will be used. For a given dimension d we will denote by $\overline{\kappa}_d$ the MLSEC based on eqs. 2 and 3, given a selected $\mathbb{R}$. MLSEC operator for a discrete domain is defined as a summation for all the neighbors in the area ω enclosed by $\mathbb{R}$:

$$\overline{\kappa}_d = -div(\overline{w}) = -\frac{d}{r}\sum_{i=1}^{r} \overline{w}_i^t \cdot n_i \quad (4)$$

where r stands for the selected adjacency and will be given by the specific $\mathcal{C}$ (for example, in 2D we can choose 4 or 8 adjacency), and d is the dimensionality of the space. Once $\overline{\kappa}_d$ has been established as a good creaseness measure, it can still be improved by pre-filtering the image gradient vector field in order to increase the degree of attraction/repulsion at ridge-like/valley-like crease. This can be done by the structure tensor analysis. In the d-dimensional space, given a symmetric neighborhood of size $\sigma_1$ centered at a given point x, namely $\mathcal{N}$ x; $\sigma_1$), the structure tensor M is defined to be the symmetric and semi-positive definite d×d matrix $$M(x; \sigma_1) = \mathcal{N}(x; \sigma_1) * (w(x) \cdot w^t(x)) \quad (5)$$

where the convolution "*" is element wise.

The eigenvector which corresponds to the highest eigenvalue of $M(x; \sigma_1)$, $w'(x; \sigma_1)$, yields the dominant gradient orientation at x, where "dominant" means inside the neighborhood $\mathcal{N}(x; \sigma_1)$. A suitable choice for the neighborhood $\mathcal{N}(x; \sigma_1)$ is a d-dimensional Gaussian, $\mathcal{N}(x; \sigma_1) = G(x; \sigma_1)$. The eigenvector which corresponds to the lowest eigenvalue of $M(x; \sigma_1)$, namely $v'(x; \sigma_1)$, yields the dominant orientation at x, which is perpendicular to the dominant gradient orientation. This analysis assumes that within each neighborhood there is a single dominant orientation. In order to verify this assumption, a normalized confidence measure is introduced: to each orientation we associate a real value $C \in [0, 1]$ which can be computed from the eigenvalues of the structure tensor. Similarity of the eigenvalues of the structure tensor implies isotropy, and, as a result, C should be close to zero. Therefore, denoting by $\lambda_1, \ldots, \lambda_d$ the eigenvalues of M, a logical choice consists of testing whether the sum of quadratic difference of them:

$$\lambda_\Delta(x; \sigma_1) = \sum_{i=1}^{d} \sum_{j=i+1}^{d} (\lambda_i(x; \sigma_1) - \lambda_j(x; \sigma_1))^2 \quad (6)$$

exceeds a predefined threshold c characteristic for $\lambda_\Delta$ in the structure we want to enhance. A suitable function is:

$$C(x; \sigma_1; c) = 1 - e^{-\lambda_\Delta(x;\sigma_1))^2/2c^2} \quad (7)$$

C. Crease Extraction

The method includes a technique for crease extraction 106. In one particular embodiment of the method, and without limitation, the creases and valleys are computed according to the following method steps as shown in FIG. 3:

1. Compute the gradient vector field w and the structure tensor field M 302. The method uses a Gaussian neighborhood to compute M:

$$M(x; \sigma_1) = \begin{pmatrix} s_{11}(x; \sigma_1; \sigma_D) & s_{12}(x; \sigma_1; \sigma_D) \\ s_{12}(x; \sigma_1; \sigma_D) & s_{22}(x; \sigma_1; \sigma_D) \end{pmatrix} \quad (8)$$

$$s_{11}(x; \sigma_1; \sigma_D) = G(x; \sigma_1) * (L_x(x; \sigma_D) L_x(x; \sigma_D))$$

$$s_{12}(x; \sigma_1; \sigma_D) = G(x; \sigma_1) * (L_x(x; \sigma_D) L_y(x; \sigma_D))$$

$$s_{22}(x; \sigma_1; \sigma_D) = G(x; \sigma_1) * (L_y(x; \sigma_D) L_y(x; \sigma_D))$$

The new parameter $\sigma_D$ denotes the standard deviation of the Gaussian kernel involved in the differentiation process needed to compute w in a well-posed manner. The parameter $\sigma_D$ is called the differentiation scale in opposition to $v_1$ which is called the integration scale. The differentiation scale is tuned to the size of the objects whose orientation has to be determined, while the integration scale is tuned to the size of neighborhood in which an orientation is dominant.

2. Perform the eigenvalue analysis of M 304. According to one embodiment, the normalized eigenvector w' corresponding to the highest eigenvalue gives the predominant gradient orientation. In the structure tensor analysis, opposite directions are equally treated. Thus, to recover the direction w' is put in the same quadrant in 2-D as w. Then, the new vector field $\tilde{w}$ is obtained:

$$\tilde{w} = sign(w^e \cdot w) w' \quad (9)$$

where $$sign(p) = \begin{cases} +1 & \text{if } p > 0 \\ -1 & \text{if } p < 0 \\ 0 & \text{if } p = 0 \end{cases} \quad (10)$$

in order to reinforced the attraction/repulsion of vectors.

3. Compute an enhanced creaseness measure 306. According to one embodiment, the enhanced creaseness measure 306 MLSEC-ST as:

$$\tilde{\kappa}_d = -div(\tilde{w}) \quad (11)$$

4. Compute a confidence measure C to discard creaseness at isotropic areas 308. In this way, product of the confidence with the result of the MLSEC ($\tilde{\kappa}_d C$) has a lower response than $\tilde{\kappa}_d$ at isotropic regions, and will be taken as the final creaseness measure.

Once the methodology for crease extraction is established, the parameters involved must be fixed. The retinal image quality is highly variable due to several factors as different contrast levels, different light sources, or the presence of background noise. Even different areas in an image do not share the same characteristics. For this reason, the use of static values for the involved parameters in the crease extraction process is not suitable.

Most of the angiographies do not have an uniform contrast all over the image, since this feature is usually local to some regions. Therefore, the contrast analysis will be performed just in the region of interest, that is, over the analysis circumference. The grey level of the pixels in the analysis circumference is represented in a linear way, which we call linear profile, as shown in FIG. 4. Both veins and arteries should have darker grey levels in the image, so they must appear as valleys in the linear profile representation. At this point, a higher contrast in the research region implies deeper valleys in the vessels' profile representation.

The m extreme values $ext_i$; i=1, ..., m of the linear profile are used to determine the contrast: the minima position will be around the middle of valleys and the maxima position will be between valleys. A large variability among these values shows a high quality contrast whereas a small variability shows a low quality contrast.

According to a particular embodiment, and without limitation, the computation of the variability has several steps. First, a median filter is applied to the vessels' profile in order to reduce noise from the original image. Afterwards, extreme values, that is, maxima and minima, are located in the smoothed vessels' profile. An irregular signal is obtained connecting the extreme values. Thus, the contrast estimation is given by the fluctuations among maxima and minima: higher fluctuations imply higher contrast in the research circumference. The variability is computed as follows:

$$\text{variability} = \frac{1}{m} \sum_{i=1}^{m} |\mu - ext_i| \tag{12}$$

where m is the number of gray extreme values $ext_i$ and $\mu$ is their mean value.

The variability is used to establish empirically three categories of image contrast, low (variability$\cong$0), normal (variability$\cong$12), and high (variability$\cong$24). After that, the parameter set can be empirically adjusted for each category.

According to one embodiment, the crease extraction process has a preliminary step in which the image variability is computed in order to classify the image into one of the three contrast categories. After that, the creases are extracted using the parameter set of the selected category. Thus, the crease extraction process will lead to similar results independently of the image quality.

According to one embodiment, as shown in FIG. 5, once the crease image is computed, the intersections between each crease and the analysis circumference are marked as the candidate vessels. In order to distinguish between vessels and noise a crease tracking process is performed. The crease tracking is performed in 2n+1 concentric circumferences of radii $\lfloor r-n, r+n \rfloor$ around the radius r analysis circumference. For each circumference, a set of candidate vessel points is selected, $CV_r = \{cv_{ir}\}$. To obtain this set of points, a 3×3 pixel window is centered in each point of the analysis circumference in the crease image, as depicted in FIG. 5. If the highest grey level of this window is greater than a threshold, the point will be a new candidate $cv_{ir}$. This way, points in low level creases corresponding to noise segments will be discarded, and only points in high level creases corresponding to vessels will not be removed.

Once the candidate points $CV_r$ have been selected for each circumference, the next step consists of linking the candidate points of consecutive circumferences to form blood vessels. A point $cv_{j_{r-1}}$ is linked to an adjacent point $cv_{k_r}$ if the angle $\theta$ between them is less than a threshold $\epsilon$, as shown in FIG. 5.

According to one embodiment of the method, and without limitation, for each pair of consecutive points of a vessel l, a vote is added to l. At the end of the tracking, only the vessels with more than $$\frac{2n}{3}$$

votes are considered, where 2n+1 is the number of circumferences analyzed.

D. Vessel Measurement

After detecting the vessels, the method performs the measurement of vessel diameters 208 over the analysis circumference. According to one embodiment, vessel measurement is based on a snake or active contours. A snake or active contour is defined as a polygonal surface that evolves within the image until it matches the boundaries of a target object. Its shape is directed by forces and it becomes stable when it minimizes its energy function, that is, when the snake reaches the target object.

The snake is defined as v(s)=[x(s), y(s)], where x(s), y(s) are x, y coordinates along the contour and s $\in$ [0, 1] is the parameter domain. The energy functional to be minimized is:

$$\int_0^1 E_{snake}(v(s))ds = \int_0^1 E_{int}(v(s))ds + \int_0^1 E_{ext}(v(s))ds \tag{13}$$

where $E_{int}$ represents the internal energy, which controls the flexibility and elasticity of the snake, and $E_{ext}$ is the external energy which moves the snake toward the target objects.

According to one embodiment of the method, the proposed snake model used is adapted in order to use specific knowledge of the domain. The adaptation includes the shape, the energy terms which drive the growing direction, and the seed, that is, the initial contour. The snake initialization is an important issue because the final adjustment depends on the initial contour. In one embodiment, the initial contour is the crease piece from the lowest to the highest circumference used in the previous tracking step. The seed of the proposed model consists of two parallel chains of nodes placed at both sides of the crease. The number of initial nodes of a snake $S_i$ is $N_i = 2C_i/R$, where $C_i$ is the number of points in the crease and R $\in$ [3, 15] is a constant parameter which controls the sampling, that is, the model resolution.

Figure 6:
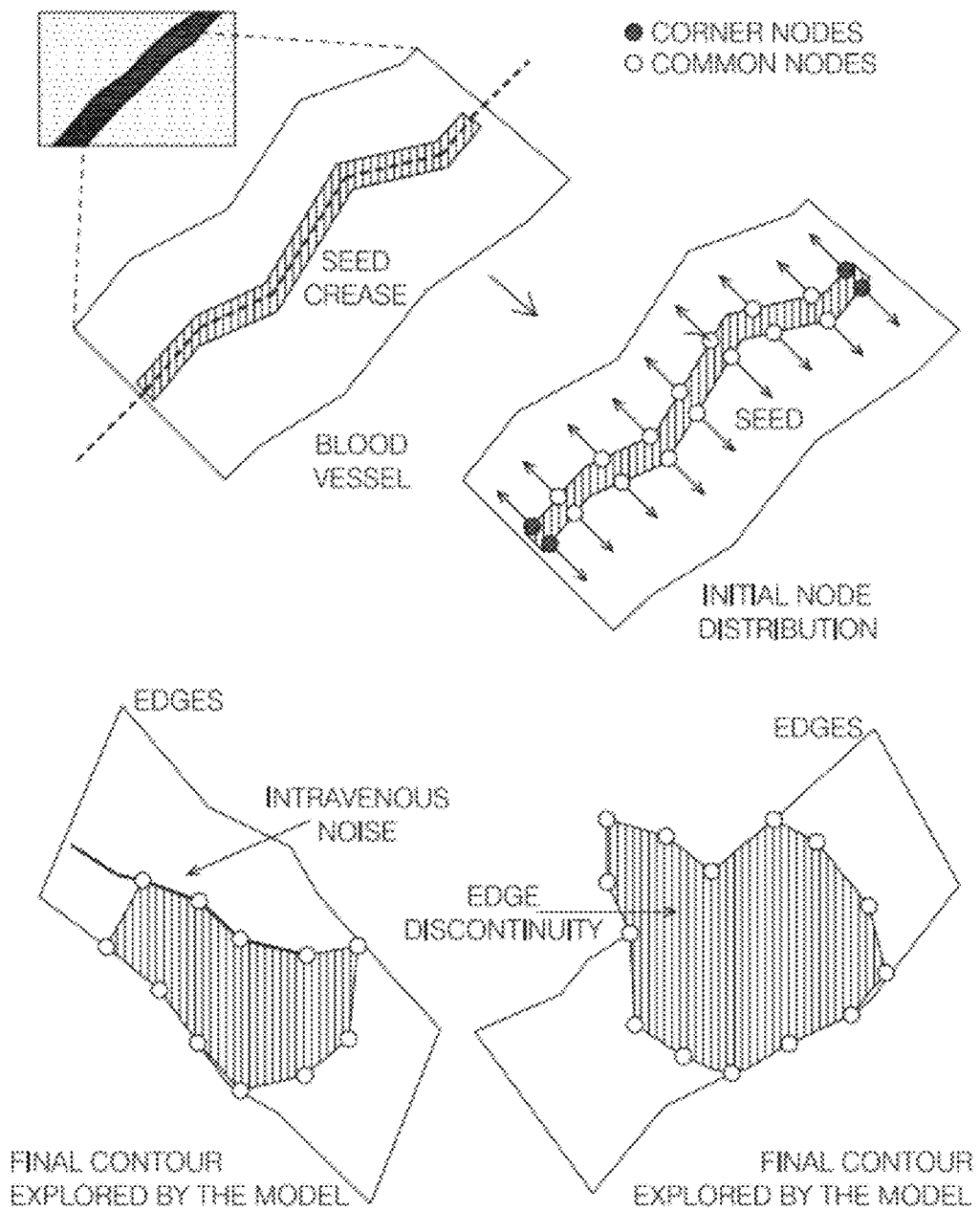
FIG. 6 shows an example to illustrate the vessel measurement method.

The general profile of the vascular structures is like a pipe which keeps almost a constant orientation. For this reason, the direction and orientation of every snake vertex can be pre-established. The direction must be perpendicular to the seed angle and does not change during the model deformation. The seed angle is computed using the points of the crease located at both ends of the crease segment. The way of the movement is from the model seed to the vessel edge. There are also two kind of nodes in the model: the common nodes and the corner nodes as shown in FIG. 6. Common nodes fit the vessel edges whereas corner nodes are adjusted to the corners of the piece of vessel that is being measured. FIG. 6 shows an example to illustrate 1) the initial distribution of snake nodes in the seed including corner nodes and common nodes in a blood vessel; and 2) an example of difficulties resulting in lack of precision after the application of the edge detection filter from intravenous noise where the snake gets trapped by the wrong edge or edge discontinuity where the snake flows outside the vessel.

According to a particular embodiment, and without limitation, the internal snake energy is defined by:

$$E_{int}(v(s)) = \alpha(v(s))|v_s(s)|^2 + \beta(v(s))|v_{ss}(s)|^2 \tag{14}$$

where the first term is the first order derivative and the second term, the second order derivative. The former makes the snake behave like a membrane and the latter, makes it act like a thin plate. The derivatives are estimated using the finite differences technique. In this embodiment, the parameters have different values for each kind of node $v_i$:

$$\alpha(v_i) = \beta(v_i) = 0 \Leftrightarrow v_i \in \{\text{corner nodes}\} \quad (15)$$
$$\alpha(v_i) = \hat{\alpha}, \beta(v_i) = \hat{\beta} \Leftrightarrow v_i \in \{\text{common nodes}\}$$

where $\hat{\alpha}$ and $\hat{\beta}$ are constant. Corner nodes have no internal energy, which implies the presence of first and second level discontinuities in the contour corners. Consequently, corner nodes fit the vessel edges better because no attraction forces trying to keep them together.

According to one embodiment, the external energy performs the outer forces so it includes the knowledge about the domain. It is defined as:

$$E_{ext}(v(s)) = \gamma \bar{\eta} + \delta E_{sit}(v(s)) + \epsilon E_{grad}(v(s)) + \omega E_{stat}(v(s)) \quad (16)$$

where $\bar{\eta}$ is the dilation pressure, $E_{dist}$ is the edge-driven distance, $E_{grad}$ is the gradient energy, and $E_{stat}$ the stationary energy. $\gamma$, $\delta$, $\epsilon$, and $\omega$ are the weights of the previous energies, respectively. The dilation pressure $\bar{\eta}$ is a vectorial magnitude whose main target is to fix the advance direction and orientation of each vertex. The model is able to expand its nodes and reach the energy minimum from the initial configuration due to this term. The edge-driven distance $E_{dist}$ is the distance from each node $v(s)$ to its nearest edge in its advance direction and orientation:

$$E_{dist}(v_i) = \text{dist}(v_i, I_{canny}) \quad (17)$$

where $I_{canny}$ is the Canny edge image computed from the original angiography.

The gradient energy $E_{grad}$ is just a stopping force. The gradient for a node $v_i$ is:

$$\text{grad}(v_i) = I(\hat{v}_i) - I(v_i) \quad (18)$$

where $I(v_i)$ is the grey level on the position of the node $v_i$ in the original image and $I(\hat{v}_i)$ is the grey level on a possible new position of the node in the advance orientation. The gradient energy is defined by:

$$E_{grad}(v_i) \begin{cases} 0 & \Leftrightarrow \text{grad}(v_i) \geq 0 \\ \text{grad}(v_i)^2 & \Leftrightarrow \text{grad}(v_i) < 0 \end{cases} \quad (19)$$

The pixels involved in this computation are smoothed with a median filter in order to prevent noise effects in this term.

The stationary energy $E_{stat}$ is also a stopping force. It measures the adjustment among each node $v_i$ and its neighbors $v_{i-m} \ldots v_{i+m}$, where m represents the m neighbor vertices. This term solves two main issues: the intravenous noise and the edge discontinuities. The former can attract nodes to inner areas of the blood vessel, preventing a correct evolution of the snake. The latter can make the model grow without control so that the estimations of the snake energy will be wrong. The underlying idea of the stationary energy is that there is a high probability that a node will stop if all the adjacent nodes have yet stopped, that is, if all the adjacent nodes have reached the minimum energy. On the contrary, it is not probable that a node will stop if all the adjacent nodes keep on moving. The stationary energy for a node $v_i$ is defined as follows:

$$E_{stat}(v_i) = 1 - \exp\left(\left[\frac{-1}{2m} \sum_{j=i-m}^{j=i+m} E_{ext}(v_j)\right]\right) \quad (20)$$

where $E_{ext}$ is the external energy in a subset of m nodes around the node $v_i$. As a limited function is required in the crease-edge interval, the exponent of this expression must be positive to get a constrained value.

The evolution of the weighting terms involved in the external energy between the crease and the edges involves several steps. The dilation pressure $\bar{\eta}$ is a constant function that expands the mesh towards the edges. The gradient term $E_{grad}$ is null inside the edges, but it grows outside. The edge-driven energy $E_{dist}$ is a linear function with global minima on the vessel edges, and the stationary term $E_{stat}$ is an exponential function which increases rapidly near the vessel edge.

Once the snake energy is minimized, some nodes can be placed outside or inside the vessel edges due to noise or edge discontinuities. This way, the measure of the vessel diameter would be wrong as the snake is not correctly adjusted to the vessel contours. For this reason, the snake needs to be checked in order to detect and correct these wrong nodes.

Since the vascular structures are measured in limited environments of the blood vessels, the final configuration of the model is known. It can be approached through a tetrahedron or even a parallelogram, where two sides are the vessel edges and the other two, the vessel diameter. The information about the topological shape is used to detect wrong nodes in the model, which can be corrected by means of a regression model. This topological check has two steps: the detection of wrong nodes and their correction by means of a linear regression model.

Once the contour has minimized its energy function, there are different ways to locate wrong nodes. These include the distance from the vertex to the seed, which should be reasonable according to the image resolution; the angles between nodes, which must be parallel to the seed angle, and the number of iterations among adjacent nodes, which must be quite similar.

Taking into account these conditions, a node $v_i$ will be wrong if:

$$v_i \text{ wrong if} \begin{cases} \text{dist}(v_i, \text{seed}) > \lambda_{dist} \\ |\text{ang}(v_i, v_{i+1}) - \text{ang}(\text{seed})| > \lambda_{ang} \\ \left|\text{iter}(v_i) - \frac{1}{k}\sum_{j=1}^{k}(v_j)\right| > \lambda_{iter} \end{cases} \quad (21)$$

where dist is the shortest distance from the seed to the node; ang($v_i$, $v_{i+1}$), the angle between adjacent nodes; ang(seed), the angle between the seed and the x axis; iter($v_i$), the number of iterations needed to reach the final position of $v_i$; and k the number of nodes in each side of the snake. $\lambda_{dist}$, $\lambda_{ang}$, and $\lambda_{iter}$ are the highest allowed caliber, the threshold to compare angles, and the threshold to compare iterations, respectively.

Figure 7:
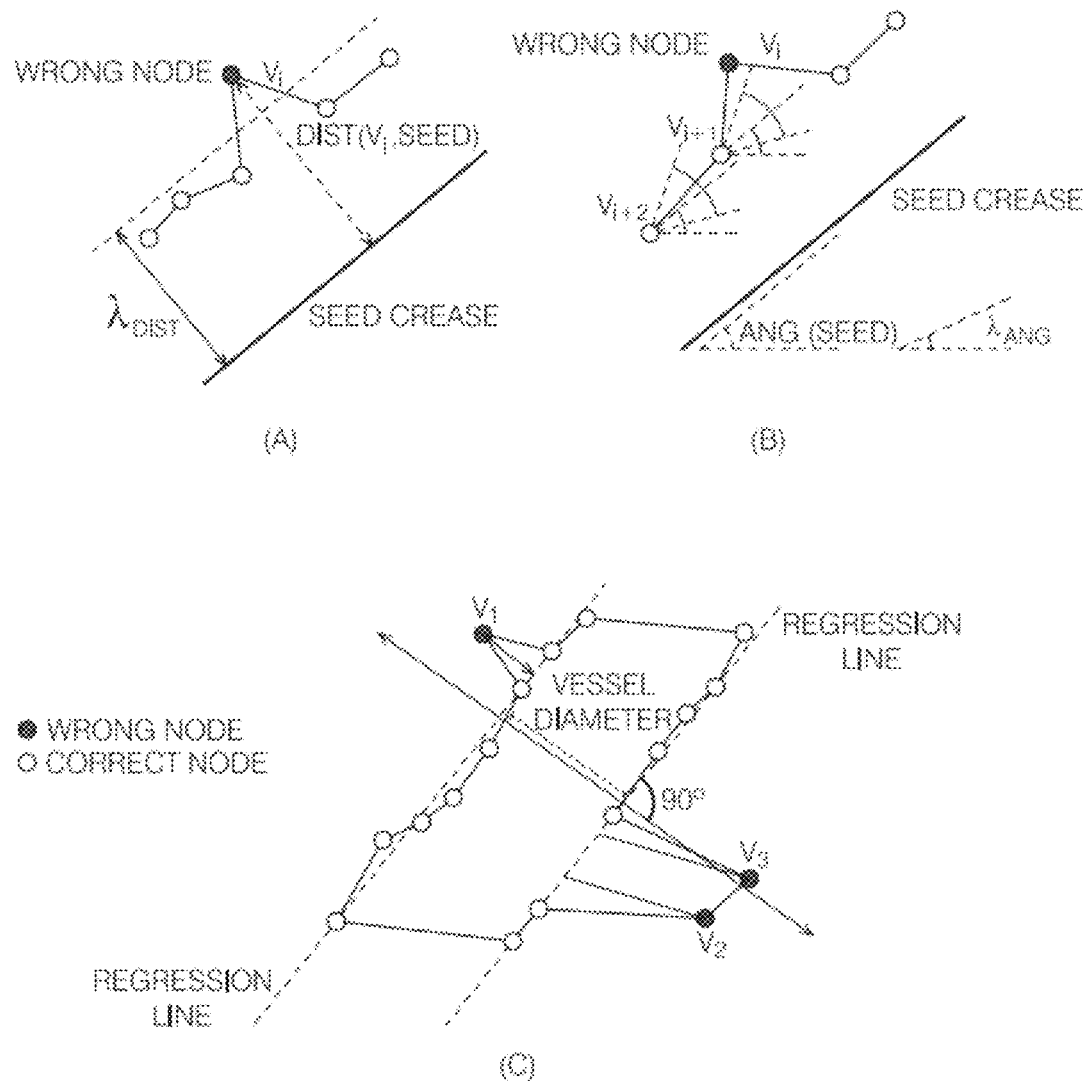
FIG. 7 shows an an example to illustrate the process of detection and correction of wrong nodes from correct nodes.

As soon as the wrong nodes are marked, their positions are corrected using a linear regression model. The right nodes of each side of the vessel are used as the model variables to get both linear regression models, which should be aligned to the vessel margins. FIG. 7 shows an an example to illustrate the process of detection and correction of wrong nodes from correct nodes.

The snake must have a ratio of right nodes and a regression accuracy in order to guarantee appropriate corrections. An exact linear slope is warranted if there is a minimum proportion of nodes in each side of the snake (70%-90%) whereas the regression accuracy can determine whether the model is suitable enough to describe the relationship between the coordinates of the variables. In this way, it is useful to employ the correlation coefficient:

$$R^2 = \frac{s_{xy}^2}{s_x^2 s_y^2} \quad (22)$$

where $s_{xy}^2$ is the model covariation; $s_x^2$, the x variation; and $s_y^2$, the y variation. Values for $R^2$ near 1 indicate an adequate model adjustment, whereas values near 0 show a bad adjustment. According to one embodiment, if $R^2$ is in the interval [0.80; 0.95] the model is considered adequate and the nodes can be adjusted correctly.

Once the vessel diameter is measured from the snake, the computed value must be corrected because the angiography was smoothed in order to discard noise. The standard deviation of the smoothing algorithm often shifts the real edge positions so the performed measurement can be imprecise.

Figure 9:
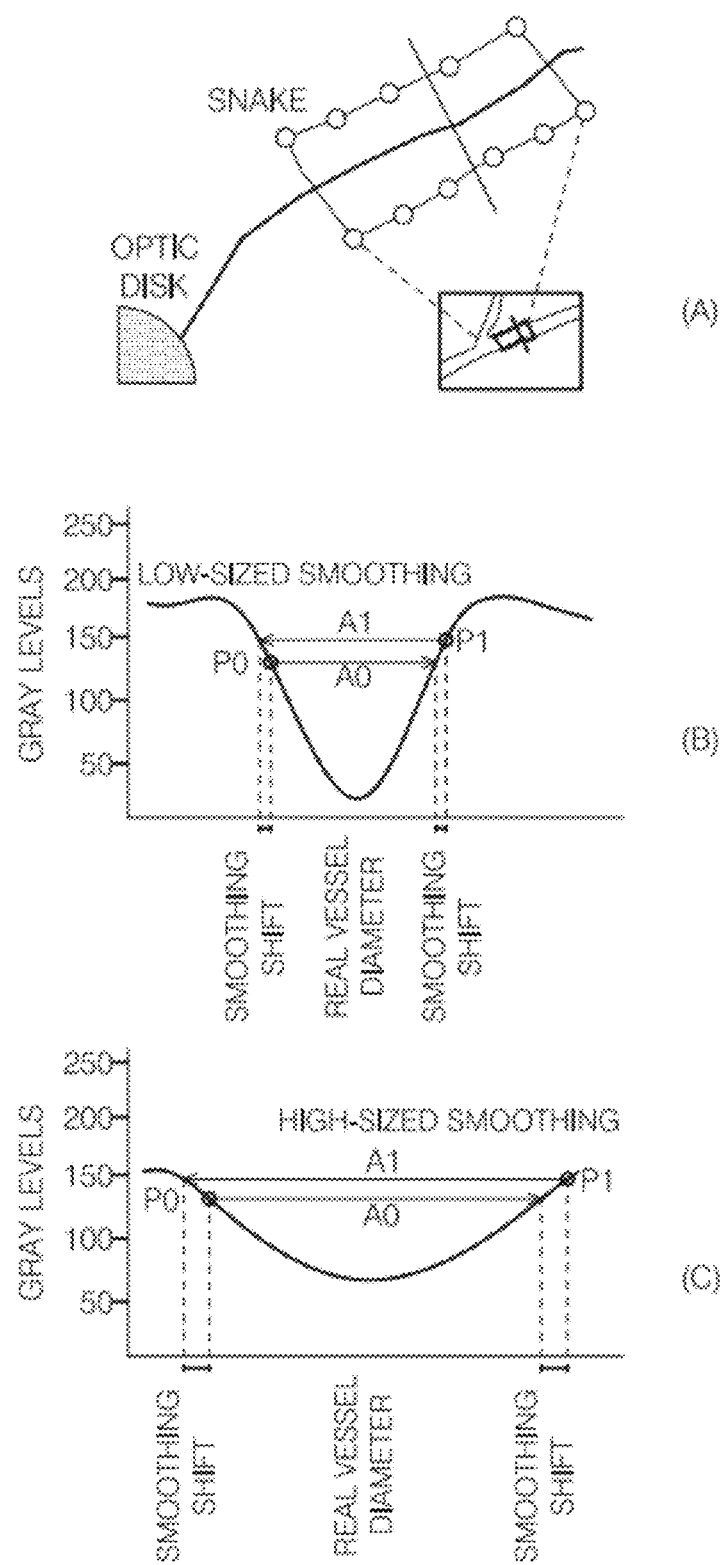
FIG. 9 shows an example to illustrate the computation of the kurtosis.

According to one embodiment, in order to improve the measure of the vessel diameter, the method includes a technique to approach the vessel section from a parabolic regression model. Three points are needed for this method: the final boundary position at both sides of the vessel ($p_0$, $p_1$) as well as the crease position. Taking the line from the optic nerve center as the x axis and the grey level of the smoothed image as the y axis, a parabola with a given profile $a_0/a_1$ (kurtosis) is generated. Consequently, the diameter depends both on the smoothing deviation $\sigma$ and the vessel profile. A diameter estimation is given by the intersection among the parabola and the points ($p_0$, $p_1$), but the y value must be recomputed as follows:

$$y_{new} = y_{old}\left[c + (1-c)\frac{a_0}{a_1}\right], \quad c = 1 - \frac{\sigma}{100} \quad (23)$$

where $y_{dd}$ is the gray level after smoothing the region, which results in the smoothing filter having a lower effect in the final estimation of the vessel diameter. FIG. 9 shows an example to illustrate the computation of the kurtosis.

D. Computation of the Arteriovenous Ratio

Figure 8:
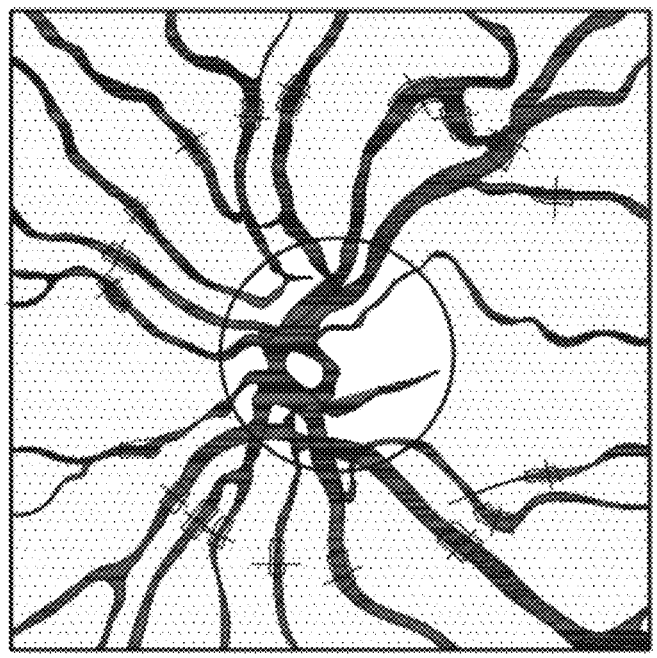
FIG. 8 shows an example to illustrate the resulting snakes after the energy minimization and the topological check in the model.
Figure 8:
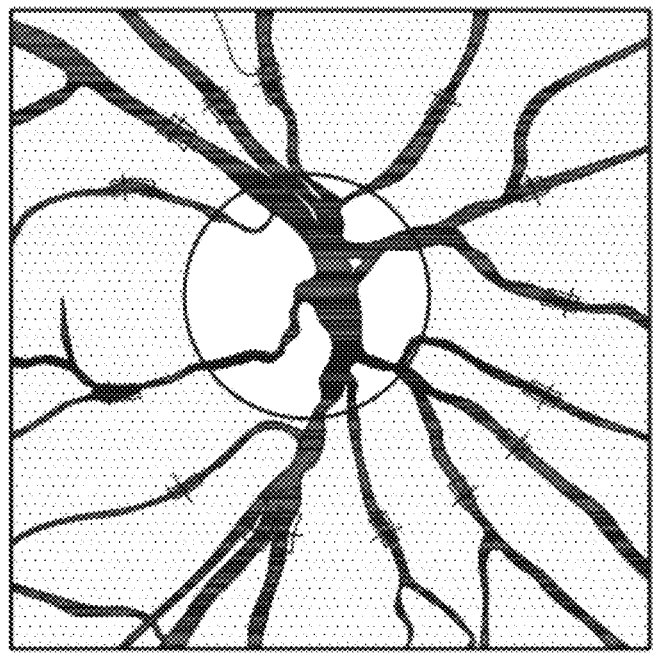

Once the vessels are detected and classified 210, according to one embodiment, the AVR is computed 212 as follows:

$$AVR = \frac{\sum C_A}{\sum C_V} \quad (24)$$

where $C_A$ and $C_V$ are the average caliber of the arteries and veins, respectively, found in the analysis area (FIG. 8). In one embodiment of the method, retinal vessel classification 110 is performed automatically based on a color clustering strategy and a vessel tracking procedure based on minimal path techniques. In an alternative embodiment, the system is semi-automatic and allows a medical professional such as an ophthalmologist to perform the classification step with computed aided support. In a third embodiment, both options are available and the method can be fully automatic or semi-automatic based on the requests of the operator.

In alternative embodiments, other clinical parameters beyond the AVR are computed using their direct definition based on the classification of arteries and veins, as well as the vessel calibers. As an example, and without limitation, any metric for summarizing retinal vessel calibers from retinal images is implemented in the system and readily available for reporting. As an example, and without limitation, these clinical parameters include Parr's metric for quantification of the arteriolar caliber, Hubbard's metric for retinal venular caliber quantification, the Parr-Hubbard ratio, central retinal artery equivalent (CRAE) metric, central retinal vein equivalent (CRVE), CRAE to CREV ratio, CRAET (trunk variant), CRAEB (branch variant), AVRT (ratio using CREAET), and AVRB (ratio using CRAEB).

E. Medical Apparatus and System

The previous sections described in detail a method for retinal image analysis designed to be implemented in a medical system with one or more processors comprising the method steps of: (a) locating an optical disk on the retinal images and establishing a plurality of circumferences centered at the disk 102; (b) detecting a plurality of vessels within a region defined by said circumferences' radii using a crease-based algorithm 104; (c) extracting a plurality of vessel segments based on a deformable models (snakes) algorithm 106; (d) measuring a plurality of vessel calibers 108; (e) classifying each vessel as a vein and an artery 110; and (f) computing an arteriolar-to-venular (AVR) ratio 112. According to one embodiment, and without limitation, the method is implemented in an apparatus containing one or more processing elements 20 (e.g. microprocessors, digital signal processors, microcomputers, or any other processing hardware), one or more memories 22 (e.g. RAM, ROM, storage memory, or any other memory device), one or more input hardware elements for controlling and operating said apparatus (e.g. keyboard, mouse, touch screen, or any other input hardware) 12, and one or more output hardware elements for displaying the results of the analysis 14 (e.g. display or any other output hardware). In particular embodiments, such system includes retinal image acquisition hardware and software to acquire the input retinal images 10 required for said method to perform said retinal image analysis processing steps. Furthermore, such apparatus implementing said method can be part of a larger retinal image analysis system including a web-enabled platform for retinal image analysis. Such system comprises a web-enabled platform for operating said system of retinal image analysis and obtaining analysis results remotely. In a particular embodiment, the method is a computer-implemented method that transforms a general purpose computer into a medical apparatus for retinal image analysis. According to one embodiment, the method is embodied as a set of instructions for causing a hardware device having at least one processor or in at least one integrated circuit to perform a method of retinal image analysis. In another embodiment, the method is embodied on a storage medium or on a signal for transmission containing the process steps as a set of instruction for causing a hardware device to carry out the method.

Certain specific details are set forth in the above description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor. Generally, program modules or protocols include routines, programs, objects, components, data structures, etc. that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that, given the description of the modules comprising the disclosed embodiments provided in this specification, it is a routine matter to provide working systems which will work on a variety of known and commonly available technologies capable of incorporating the features described herein.

F. Alternative Embodiment: Automatic Retinal Analysis

Figure 14:
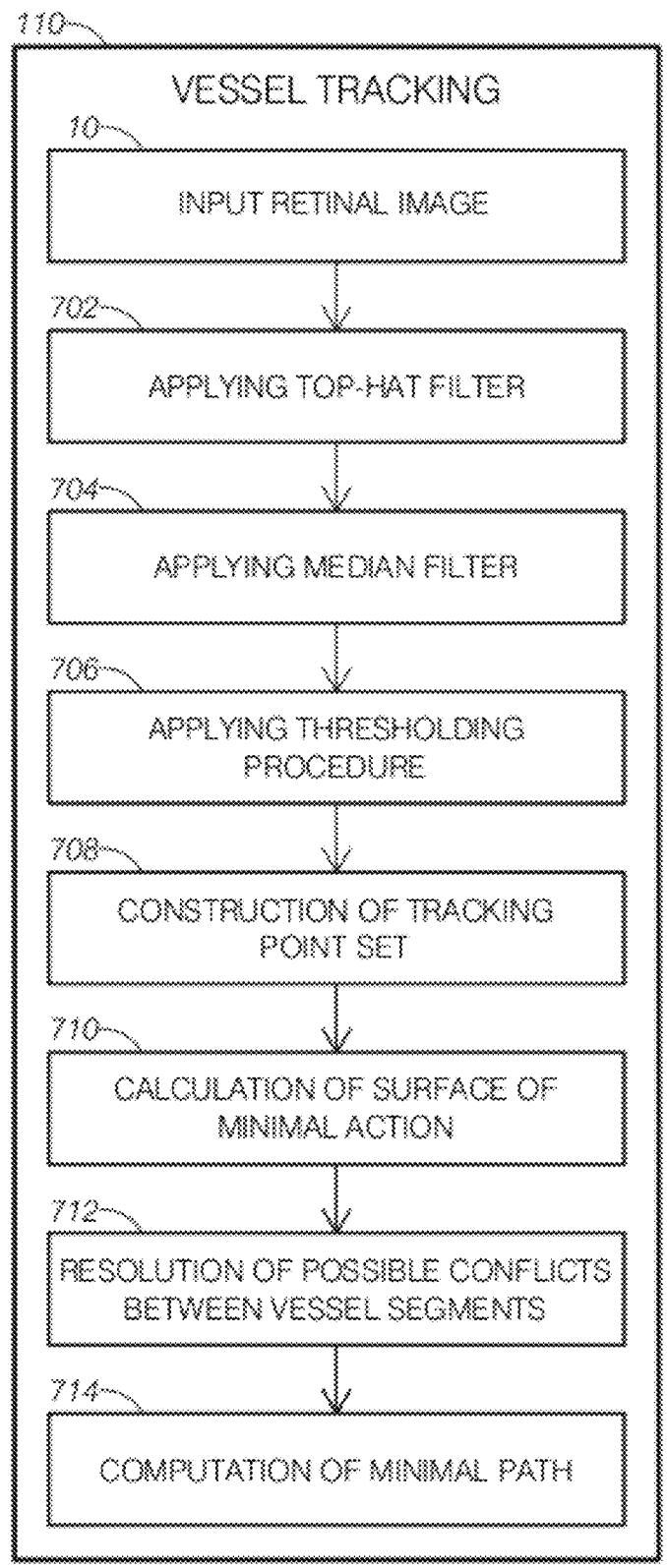
FIG. 14 shows a block diagram of the vessel tracking method.

According to one embodiment, the method performs the all the retinal image analysis tasks automatically without requiring input from an operator. The previous sections have already described embodiments for automatic analysis of all the steps, with the exception of the vessel classification step 110 which is accomplished with operator input 12 from the clinical practitioner or subject matter expert. By performing the vessel classification 110 automatically, it is possible to automatize the complete retinal image analysis method 100 and associated medical systems. Consequently, according to one embodiment, the method for automatic analysis of a retinal image implemented in a medical system with one or more processors comprises: (a) automatically locating an optical disk on said retinal image and establishing a plurality of circumferences centered at the disk 102; (b) automatically detecting a plurality of vessels within a region defined by said circumferences' radii using a crease-based algorithm 104; (c) automatically extracting a plurality of vessel segments based on a deformable models (snakes) algorithm 106; and (d) automatically classifying said plurality of vessel segments (110) employing 1) an automatic vessel classification method to produce an initial classification (FIG. 10), and 2) refining the vessel classification based on a vessel tracking method (FIG. 14).

Figure 10:
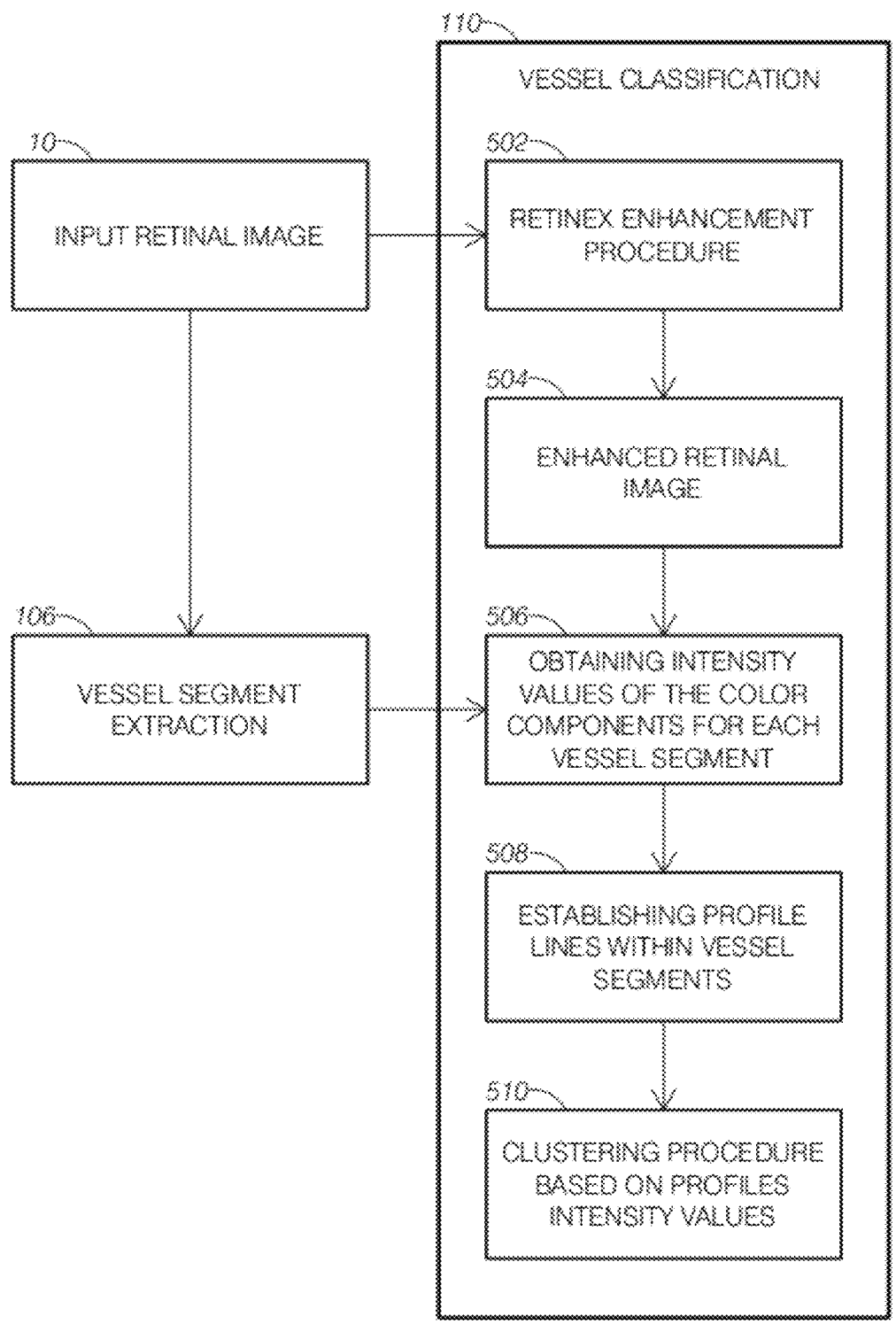
FIG. 10 shows a block diagram of the vessel classification method according to one embodiment.
Figure 11:
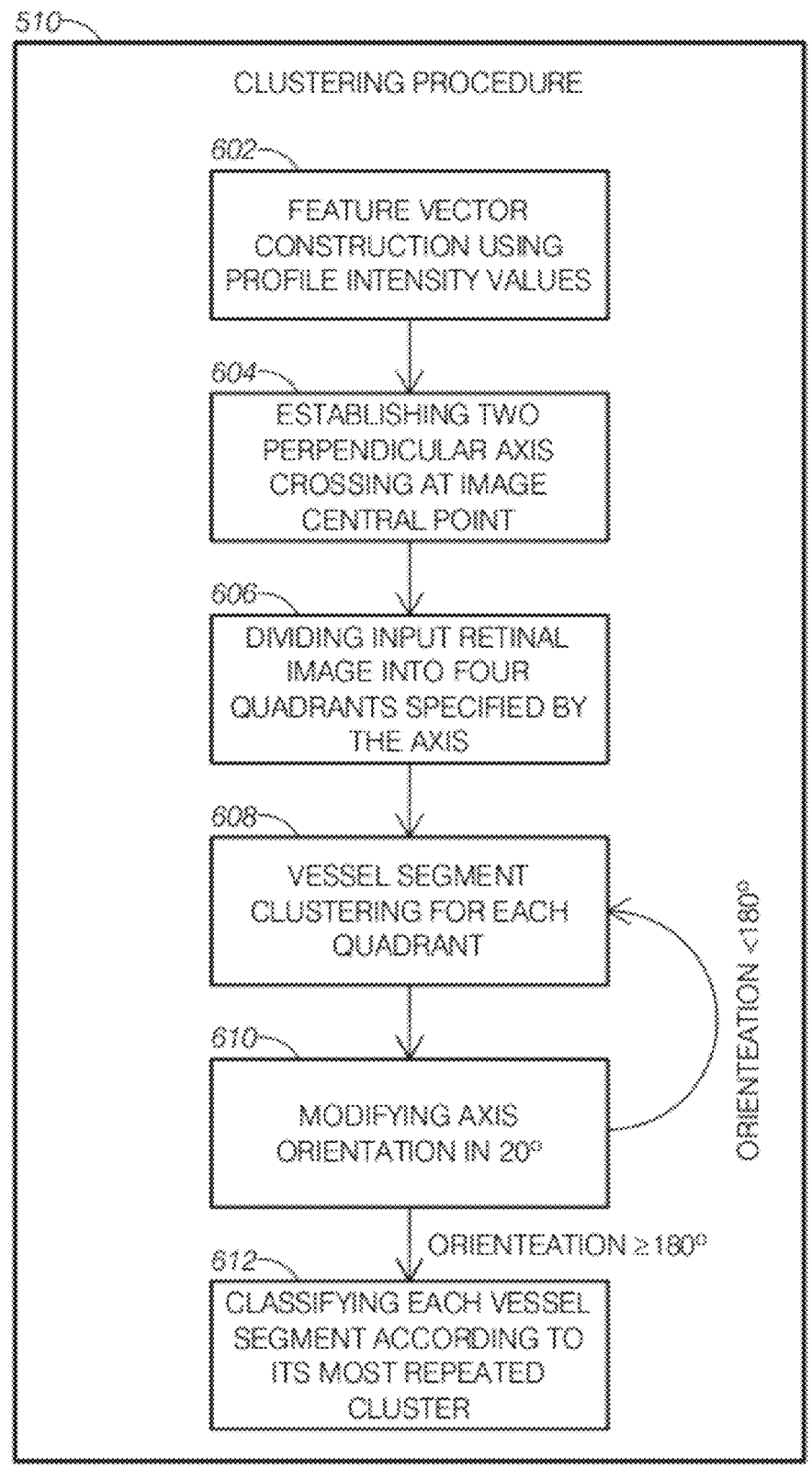
FIG. 11 shows a block diagram of the clustering procedure according to one embodiment.
Figure 12:
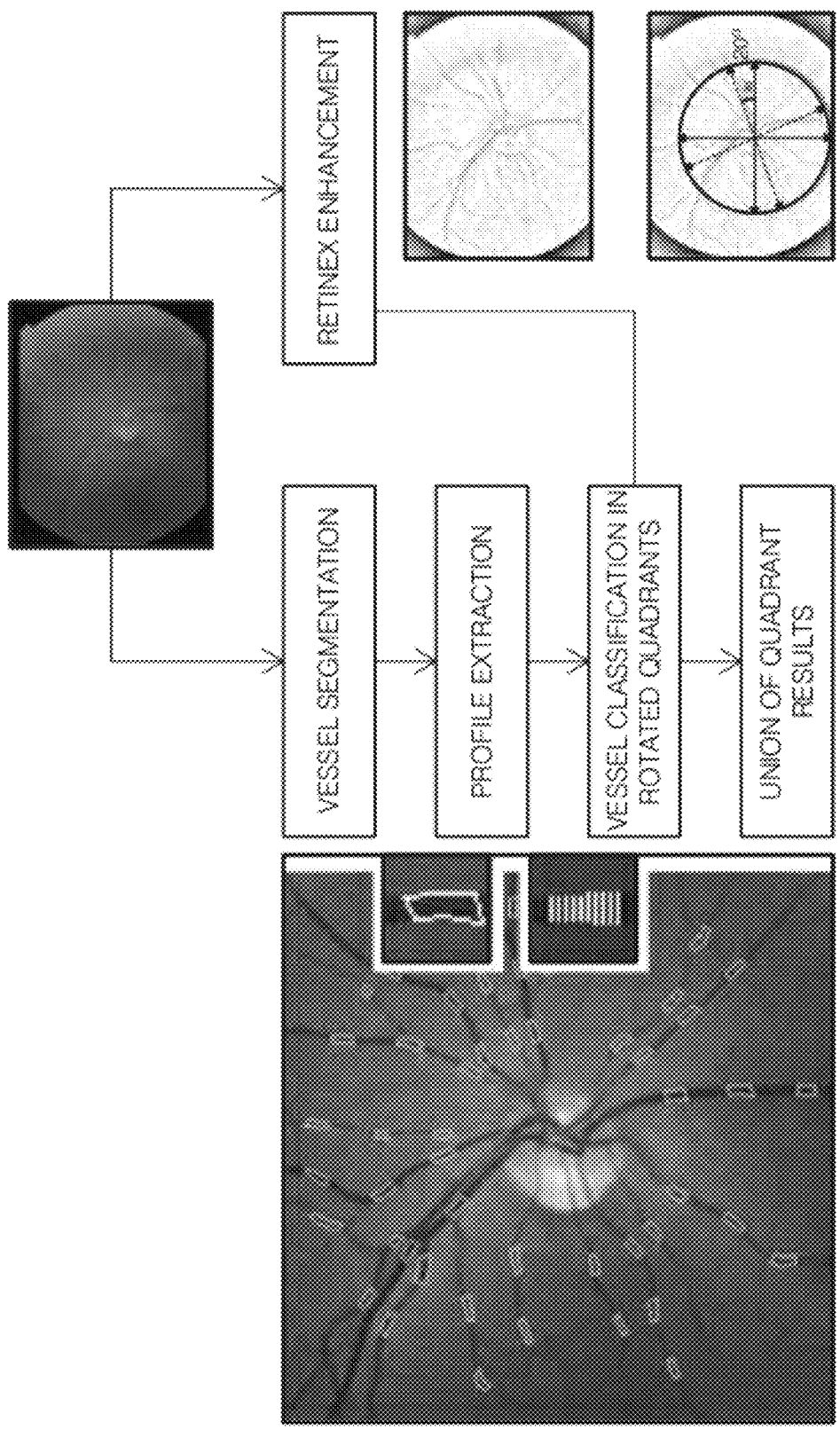
FIG. 12 provides an illustrative example of the vessel classification method steps.
Figure 13:
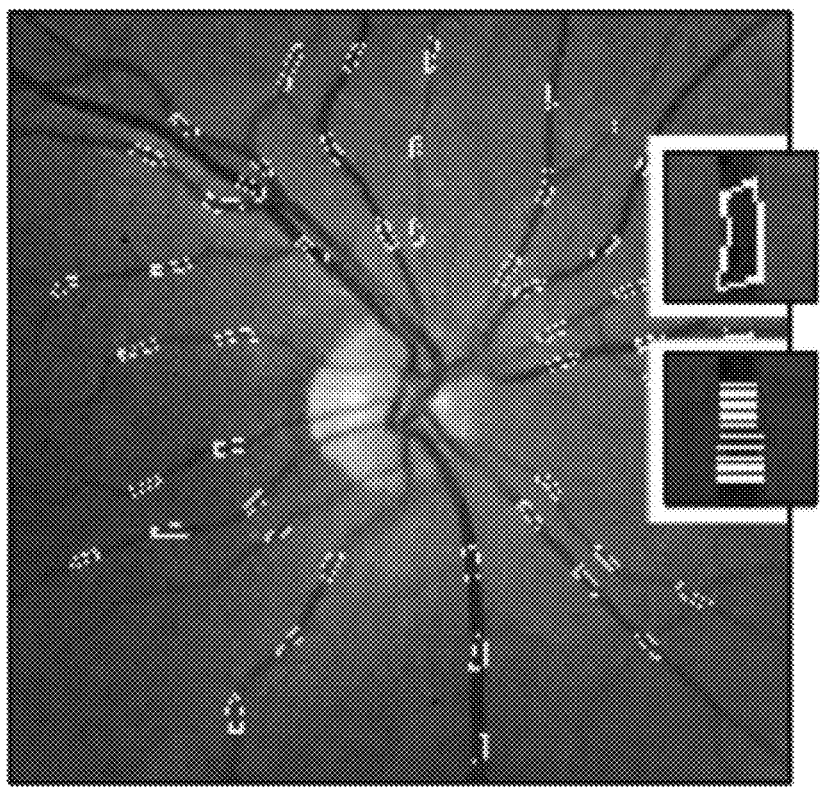
FIG. 13 provides an illustrative example of the clustering method.
Figure 13:
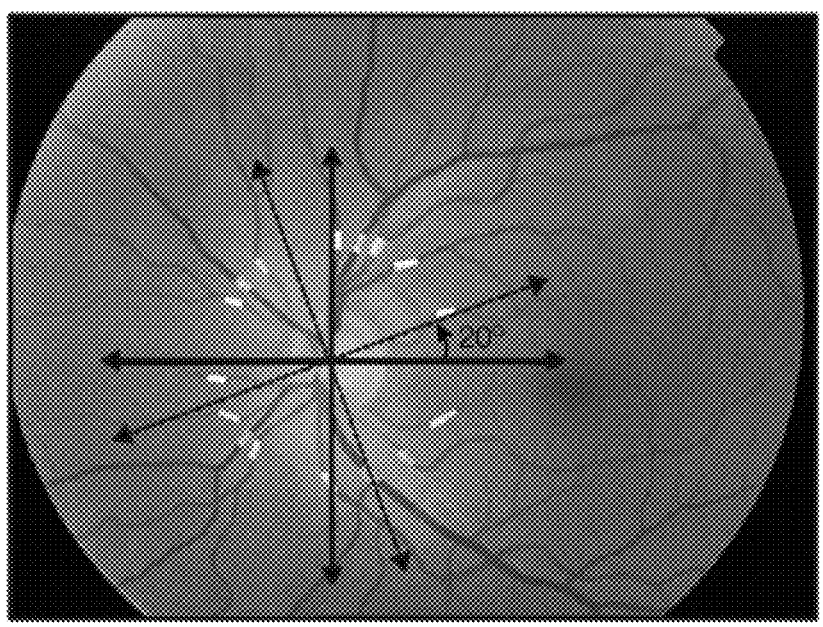

FIG. 10 shows a block diagram of the method for automatic vessel classification according to one embodiment. According to this particular embodiment, and without limitation, the vessel classification algorithm 110 comprises: 1) performing a Retinex procedure 502 to a retinal image 10 in order to obtain an enhanced retinal image 504, 2) obtaining intensity values of the color components for each vessel segment 506 obtained in the vessel segment extraction procedure 106, 3) establishing profile lines within vessel segments 508, and 4) applying a clustering procedure of the vessel segment profiles based on its intensity values 510. FIG. 11 shows a block diagram of a particular method for performing a clustering procedure 510. FIG. 10-13 show block diagrams and illustrations of the intermediate steps to help explain the automatic analysis procedure. The result of the automatic vessel classification algorithm shown in FIG. 10 is an initial classification. This classification is then refined based on a vessel tracking method shown in FIG. 14. The following subsections describe the automatically classification method in detail.

F.1. Step 1: Initial Vessel Classification

The lack of color constancy influences the vessel classification results. According to one embodiment as shown in FIG. 10, and without limitation, the method includes a step to enhance the retinal image 504 by applying a Retinex procedure 502 to the retinal image 10 in order to improve the intensity values of the color components 506 contrast. The enhanced retinal image 504 has the same dimensions but a more contrast than the original retinal image 10, resulting in an enhanced retinal image 504 more suitable for the vessel classification.

According to one embodiment, as shown in FIG. 10, and without limitation, the vessel classification procedure 110 obtains the intensity values of the color components for each vessel segment 506 and depicts every vessel segment as one or more feature vectors in the clustering space in order to perform a clustering procedure. According to this embodiment, and without limitation, the feature vectors are defined as 1-pixel thick lines perpendicular to the vessels within each segment, denominated profiles 508. The clustering procedure 510 is based on the profiles intensity values.

The vessel classification procedure 110 is based on the vessel color since the experts base their classifications on the fact that the arteries are lighter than the veins, so it is necessary to analyze different color spaces. According to one embodiment, the color spaces analyzed are RGB, HSL and gray level, computing the gray scale as a lineal combination of the three channels in RGB color model (Gray=$0.2999 \times R + 0.587 \times G + 0.114 \times B$).

The first step a classification process is to define the features for the classification. Three types of features from the vessel segments regarding the involved image pixels can be used depending on the embodiment: (a) features based on the whole vessel segment, e.g., the mean of the vessel segment pixels in a given color component; (b) features based on each profile pixel, considering the pixel value in a color component or the combination of pixel values in several color components for all pixels in each profile; and (c) features based on groups of pixels. According to one embodiment, the features considered are based in each cross section of the vessel segments, and the previously defined profiles 508 based on computing a measurement from the profile or selecting a series of values to represent the profile, e.g. the most repeated values in the profile pixels.

FIG. 11 shows an example of a particular embodiment for the clustering procedure 510. According to one embodiment the clustering procedure comprises (a) dividing the retinal image into four quadrants, and (b) iteratively rotating the axis of said quadrants by an incremental angle and performing vessel segment clustering for each quadrant based on a K-means algorithm with an arteries cluster and a veins cluster. In a more particular embodiment, and without limitation, the clustering procedure 510 comprises the steps of: 1) constructing a feature vector using profile intensity values 602, 2) establishing two perpendicular axis crossing at the input retinal image central point 604, 3) dividing the input retinal image into four quadrants specified by the axis 606, 4) performing vessel segment clustering for each quadrant 608, 5) modifying the axis orientation by 20 degrees and performing again the vessel segment clustering for each quadrant 608 (repeating the process until the axis orientation returns to the initial position), and 6) classifying each vessel segment according to its most repeated cluster 612. In a particular embodiment, and without limitation, the clustering procedure 510 of the feature vectors is performed based on a K-means algorithm with two clusters, one for arteries and one for veins.

In summary, a color clustering strategy is applied to the vessels detected in each circumference independently. The feature vectors 606 used in this classification are based on the pixel intensities within the parallelograms computed in the previous stage, this is, the vessel segments. The feature vectors define profiles. In an embodiment, a profile is a 1 pixel thick segment perpendicular to a vessel. The number of profiles traced in each vessel, t, depends on the size of each parallelogram. The profile set, PR, is defined for all detected vessels as follows $$PR = \{PR_{ij}, i=1\ldots n, j=1\ldots t\} \quad (25)$$

$$PR_{ij}\{p_k, k=1\ldots m\}, p_k=(x_k, y_k) \quad (26)$$

where n is the number of detected vessels, t the number of the profiles in the i-th vessel, m is the number of points in the profile $PR_{ij}$, and $(x_k, y_k)$ are the image coordinates of the profile point $p_k$. Once the feature vectors are defined, the clustering algorithm 510 is applied to overlapped subsets of detected vessels in order to reduce the effect of uneven lightness and the number of unclassified vessels. To this end, the retinal image is divided into four quadrants 606 centered at the optic disc and the coordinate axes are rotated through an angle of 20° 610. Then, the k-means algorithm is applied to the feature vectors found in each rotated quadrant. Thus, the k-means algorithm computes the cluster centers for both artery and vein classes in each quadrant and then, using the Euclidean distance, each feature vector is classified into a class 608. The empirical probability of a vessel $v_i$ to be vein ($P^v(v_i)$) or artery ($P^a(v_i)$) in a specific quadrant is computed as follows:

$$P^a(v_i) = \frac{n_{a_i}}{n_{a_i} + n_{v_i}}, P^v(v_i) = \frac{n_{v_i}}{n_{a_i} + n_{v_i}} \quad (27)$$

where $n_{a_i}$ is the number of feature vectors that were classified as artery and $n_{v_i}$ is the number of feature vectors that were classified as vein. The final vessel probabilities $P^v$ and $P^a$ are the mean of the vessel probabilities $P_q^v$ and $P_q^a$ in all the quadrants q where the vessel was found. The vessel is classified in the class with the highest probability. According to one embodiment, if the probability values $P^v$ and $P^a$ are the same, the vessel is not classified.

F.2. Step 2: Refining Vessel Classification Based on Vessel Tracking

According to one embodiment, the classification output in the previous step is further refined based on a vessel tracking method as shown in FIG. 14. According to a particular embodiment, and without limitation, given the optic disc center and the middle point of the detected vessel segments, the method finds the minimal path between vessel segments in consecutive circumferences, analyzing these middle points. The retinal image suffers from lightness and tone variability as well as central reflexes along the vessels, so it is necessary to pre-process the images in order to enhance the retinal image used to compute the surface of minimal action. The first stage of the vessel tracking procedure is the enhancement of the vessel tree in order to mitigate the effect of the uneven lightness. In one particular embodiment, a 25×25 top-hat filter 702 is applied in order to subtract the background from the input retinal image 10. Then, the central vessel reflexes are smoothed or removed by a 3×3 median filter 704. After that, a thresholding procedure 706 is applied to identify the vessel tree points. For each pre-processed image point, the method computes the mean and the standard deviation in a 11×11 window centered at that point. If the image point is darker than the mean and its standard deviation is higher than a threshold, the point is marked as vessel; otherwise, it is marked as background. The method constructs a tracking point set 708, calculates the surface of minimal action 710, resolves possible conflicts between the vessel segments 714, and computes the minimal path 714.

The subsections below provide additional background of the techniques employed by the vessel tracking method according to particular embodiments.

F.2.a. Minimal Paths

According to one embodiment, the aim of this model is to find the curve C(s) that minimizes the following equation:

$$E(C) = \int_\Omega E_{int}(C(s)) + E_{ext}(C(s))\,ds \quad (28)$$

$$= \int_\Omega w\left\|\frac{\partial C}{\partial s}(s)\right\|^2 + P(C(s))\,ds$$

where $\Omega \in \lfloor 0, L \rfloor$ and L is the length of the curve. The internal energy is the partial derivative of the curve with respect to its parameter s and controls the regularity in the contour. The external energy term is the potential and represents the desired image features.

Since s represents the arc-length parameter, $$\left\|\frac{\partial C}{\partial s} = 1\right\|$$

and the energy of the model has the following form:

$$E(C) - \int_\Omega w + P(C(s))ds - \int_\Omega \tilde{P}(x(s))ds \quad (29)$$

The regularization of this model is achieved by the constant w>0. This term integrates as $\int_\Omega w\,ds = w\times\text{length}(C)$ and allows us to control the smoothness of the contour.

Given a potential P>0 that takes lower values near desired features, the methods looks for paths along that minimize the previous equation. Then, the surface of minimal action $\mathcal{U}$ is defined as the minimal energy integrated along a path between a starting point $p_0$ and any point p:

$$U(p) = \inf_{A_{p_0,p}} \int_\Omega (w + P(C(s)))\,ds = \inf_{A_{p_0,p}} \int_\Omega \tilde{P}(C(s))\,ds \quad (30)$$

where $\mathcal{A}_{p_0,p}$ is the set of all paths between the points $p_0$ and p. Hence, the minimal path between two points $p_0$ and $p_1$ is computed from this surface map by backpropagation starting from $p_1$ until $p_0$.

In order to compute $\mathcal{U}$, a front propagation equation related to 30 is defined:

$$\frac{\partial C(s,t)}{\partial t} = \frac{1}{\tilde{P}}\vec{n}(s,t) \quad (31)$$

where t represents the time, $\tilde{P}=P+w$, and $\vec{n}(s,t)$ is the normal to the closed curve $C(.,t)$. This equation evolves the front from a small circle centered at $p_0$ until each point inside the image domain. The value of $\mathcal{U}(p)$ is the time t when the front passes over p.

There are several numerical approaches to compute the surface of minimal action. According to one particular embodiment, and without limitation, the Fast Marching Method is used for real-time implementations. Given the potential values $P_{i,j}=P(i\Delta x, j\Delta y)$ in a grid, where $\Delta x=\Delta y=1$, the Fast Marching method aproximates $U_{i,j}$ by u using the following equation:

$$(\max\{u-U_{i-1,j}, u-U_{i+1,j}, 0\})^2 + (\max\{u-U_{i,j-1}, u-U_{i,j+1}, 0\})^2 = P_{i,j}^2 \quad (32)$$

Table Algorithm 1 details the steps involved in the computation of the surface of minimal action. Since the method selects the pixels in a specific order, it is only necessary one pass on the image.

Algorithm 1 - TABLE: Fast Marching method

Definitions:
  Alive set: points of the grid for which U has been computed and it will not be modified.
  Trial set: next points in the grid to be examined (4-connectivity) for which a estimation of U is computed using the points in alive set.
  Far set: the remaining points of the grid for which there is not an estimate for U.
Initialization:
  For each point in the grid, let $U_{i,j} = \infty$ (large positive value).
  Put all points in the far set.
  Set the start point (i, j) = $p_0$ to be zero:
  $U_{p0} = 0$, and put it in the trial set.
Marching loop:
  Select $p = (i_{min}, j_{min})$ from trial with the lowest value of U.
  If p is equal to $p_1$ being $p_1$ the final point then we finish.
  Else put p in alive and remove it from the trial set.
  For each of the 4 neighboring grid points (k, l) of $(i_{min}, j_{min})$:
    If (k, l) belongs to far set, then put (k, l) in trial set.
    If (k, l) is not in alive set, then set $U_{k,l}$ with Equation 32.

The minimal path is obtained by back-propagation from $p_1$ to $p_0$ using a discrete steepest descent algorithm, selecting at each step the connected pixel with the lowest $\mathcal{U}$. However, this method accumulates an angular error, so more precise methods, such as Heun or Runge-Kutta is used in alternative embodiments.

F.2.b. Tracking Between Vessel Segments

Based on the minimal paths approach, a vessel tracking procedure is used in order to join the vessel segments in consecutive circumferences. Consequently, the local classification results obtained in all the connected circumferences are combined to increase the certainty of the labeling.

Figure 15:
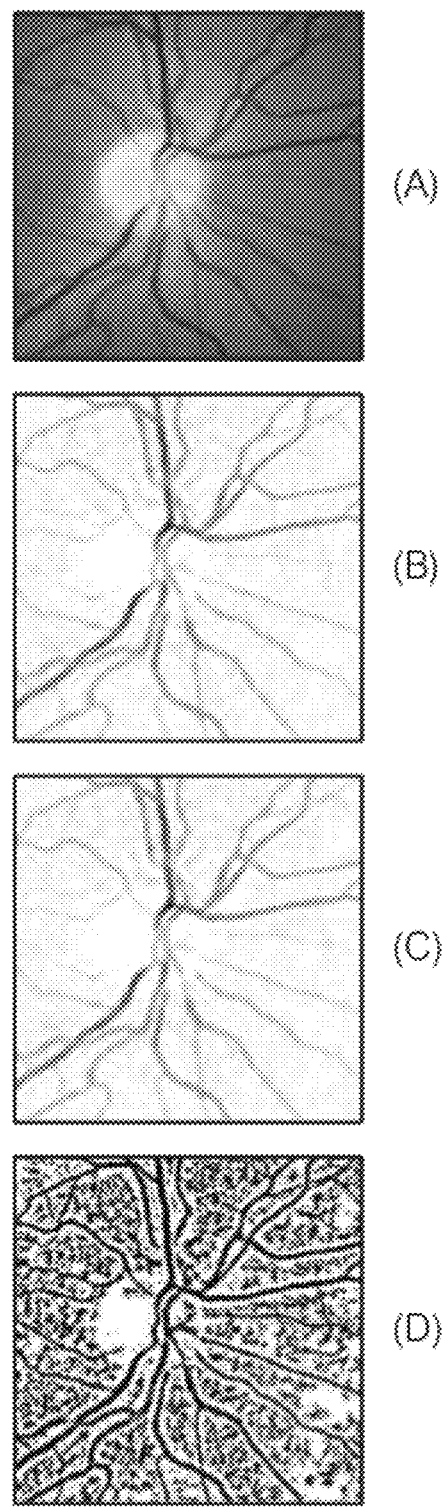
FIG. 15 shows illustrative examples of the enhancement method steps.
Figure 16:
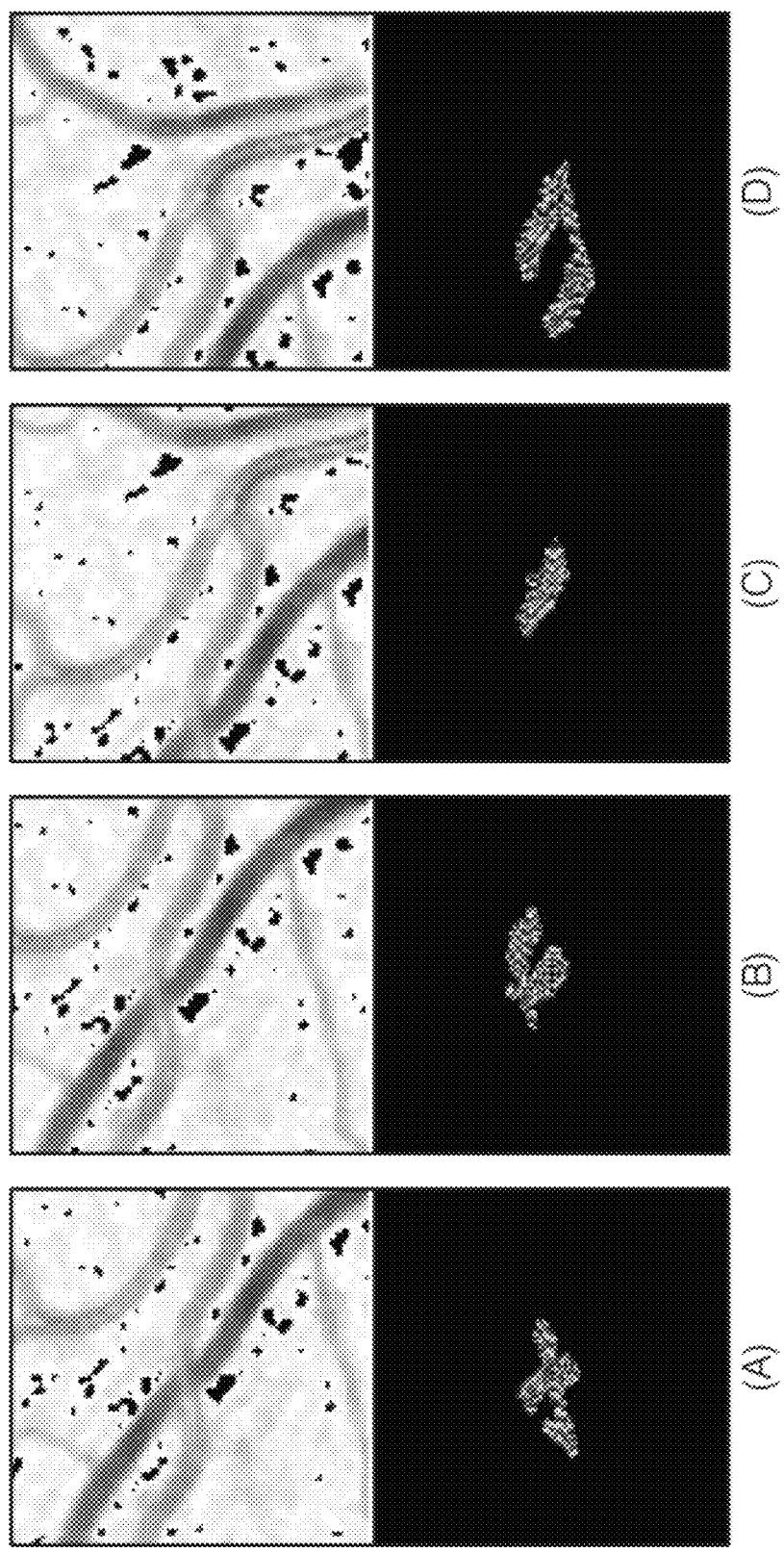
FIG. 16 shows illustrative examples of the vessel tracking method steps.

FIG. 14 shows the stages of the method according to one embodiment. As previously summarized, given the optic disc center and the middle point of the detected vessel segments, the method finds the minimal path between vessel segments in consecutive circumferences. The retinal image suffers from lightness and tone variability as well as central reflexes along the vessels, so it is necessary to pre-process the images in order to enhance the image used to compute the surface of minimal action. The method selects the points that will be joined along the vessels. Finally, it searches for the minimal path between the vessel segments in neighboring circumferences. The first stage of this methodology is the enhancement of the vessel tree in order to mitigate the effect of the uneven lightness. In one particular embodiment, first, a 25×25 top-hat filter is applied in order to subtract the background from the image. Then, the central vessel refluxes are smoothed or removed by a 3×3 median filter. After that, a thresholding algorithm is applied to identify the vessel tree points. For each pre-processed image point, we compute the mean and the standard deviation in a 11×11 window centered at that point. If the image point is darker than the mean and its standard deviation is higher than a threshold, the point is marked as vessel. Otherwise, it is marked as background. This segmentation introduces noise in the image, but it has a useful property: the segmentation clearly delimits vessel boundaries and fills the intersections between vessels. The noise problem is solved using minimal path restrictions. The method uses the minimal paths approach to join consecutive vessel segments along the same vessel. Therefore, in each circumference of radius r, the initial and final points will be the vessel segments at the circumferences r and r+1, respectively. FIG. 15 shows an example illustrating the image enhancement pre-processing method. Specifically, it shows the green channel input image (FIG. 15A), the results of the top-hat filter output (FIG. 15B), the results of the median filter output (FIG. 15C), and the results of the vessel tree segmentation (FIG. 15D).

The retinal vessels emerge from the optic disc and run in a radial fashion towards the fovea. Circumferences centered at the optic disc intersect each vessel several times. In the vessel segmentation stage, the method detects almost all the intersections between the vessel tree and the circumferences, but, in some cases, the algorithm cannot detect some points. For this reason, it also computes the intersections between the vessel tree and the selected circumferences. If a point proposed by the vessel segmentation was not marked as part of the vessel tree computed in the previous stage, the method removes it.

Empirical experimental results have demonstrated that the inclusion of intermediate vessel points improves the performance. Thus, according to one embodiment the method computes new vessel points between two consecutive input circumferences of radii $r_1$ and $r_2$ as the intersection between a circumference of radius $$\frac{r_1 + r_2}{2}$$

and the segmented vessel tree. These new points are treated as input vessel points, this is, they belong to the initial or final point sets. The computation of the minimal path between two points $p_0$ and $p_1$ involves two steps: the computation of the surface of minimal action $\mathcal{U}$ between $p_0$ and $p_1$ and the selection of the path with minimal cost by back-propagation.

The computation of $\mathcal{U}$ requires the definition of the potential P, this is, the relation between the image features and the path cost. In this case, the minimal path should follow the vessels, so that its cost within the vessel tree should be low. This way, the potential function is defined as $$P = |S - S(p_0)| + w, \quad (33)$$

where S is the smoothed image obtained in the vessel enhancemnt stage, $S(p_0)$ is the intensity value at the starting point, and w is the regularization parameter. The value of w controls the path roughness, thus, to decrease the path curvature, we have to increase this parameter or smooth the potential image.

Once the method has defined the potential image for a starting point $p_0$, the surface of minimal action for $p_0$ can be computed. The fronts are propagated from the starting circumference to the next circumference along the tree. A property in the ocular vessel tree says that the vessels propagate from the optic disc outwards. Consequently, a vessel point cannot be connected with a point in the same circumference. Therefore, according to one embodiment, the method only allows the connection between a point and other points in different circumferences, the so-called candidate points. If it reaches a point in the same circumference, it marks it as conflicting point.

However, the classic minimal path approach presented allows the front propagation in any direction. In our case, this means that a point can reach any other point in the image. To prevent this situation, the method includes restrictions in the computation of the surface of minimal action. Since it has segmented the vessel tree in a previous step, it uses this information as a new restriction. This way, the method allows the propagation over a point $p_r$ reached if it satisfies the following rules:

The point $p_r$ is marked as part of the vessel tree.

The point $p_r$ is placed on the ring delimited by the circumference that contains $p_0$ and the next circumference.

These restrictions make that the point $p_0$ can only reach points that are located in the same vessel or in a vessel that crosses it. Since the method limited the reached points, it can compute the surface of minimal action $\mathcal{U}$ by front propagation taking a small window centered in $p_0$. Thus, the method can reduce both spatial and time complexity of the algorithm. FIG. 15 shows illustrative images and the corresponding surfaces of minimal action whose starting point is the central pixel of the window.

Figure 17:
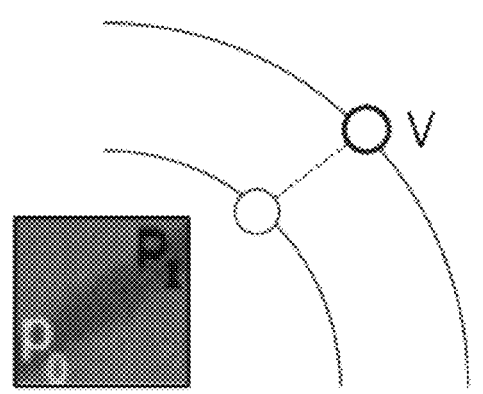
FIG. 17 shows illustrative examples of propagation cases.
Figure 17:
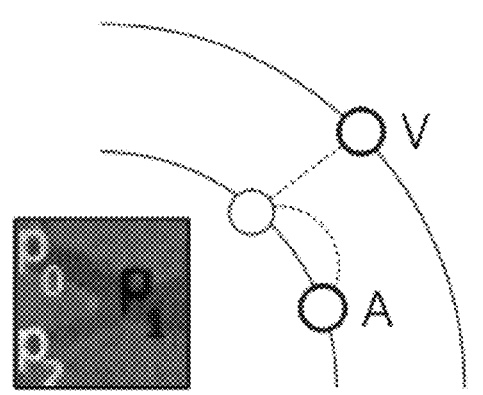
Figure 17:
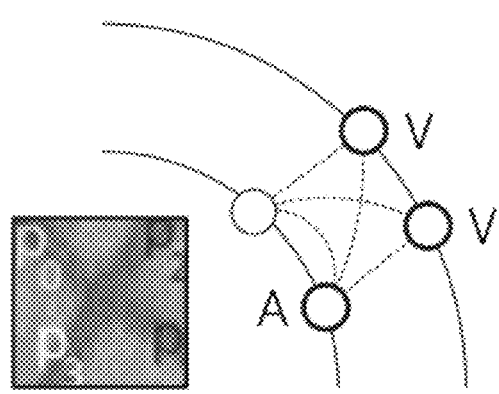

In the propagation, the front can reach vessel points in the same circumference (conflicting points) or in the next circumference (candidate points). When the front propagation stops, i.e., all the front points reach the next circumference, three situations can occur:

1. No conflicting points are found (FIG. 17A). In this case, there can be several candidate points, but it does not imply that every candidate point should be linked with $p_0$. To select the right candidates, the method considers that points which belong to the same vessel have the same intensity and they are close. So, a threshold value for the candidates' cost is taken into account. Then, the candidate point with the lowest cost is selected and the other candidate points with a cost higher than n times the lowest cost are discarded. All the remaining candidate points are linked to the starting point $p_0$.
2. There are several conflicting points and a single candidate point (FIG. 17B). This is similar to the previous case, but all the conflicting points are neighbors of $p_0$, this is, $p_0$ and the conflicting points have been reached by the propagation of the same starting point. Otherwise, the method discards the candidate point since it is over a vessel intersection and different vessels could be merged. In this case, the method propagates the front to the next circumference and repeats the point analysis.
3. There are conflicting points and several candidate points (FIG. 17C). This means that there is an intersection between the circumferences. New fronts from the conflicting points to the candidate points are propagated. If the cost from the conflicting point to the candidate point is considerably lower than the cost from the starting point, the method discards the path between the starting point and the candidate point. On the contrary, if the cost from the conflicting point is similar to the cost from $p_0$, the method calculates the path curvature between the candidate point to both initial points. If the path curvature between the starting point is lower than the obtained with the conflicting point, it keeps the point as candidate. Otherwise, it discard it. After checking these cases, the method also discards the candidate points which are far from the lowest cost.

The front propagation is repeated in every two consecutive circumferences. Finally, the method obtains the vessel links by back-propagation on each front from the outer to the inner circumferences. To improve accuracy, several intermediate circumferences are defined between each two consecutive circumferences. The vessel points in these circumferences are obtained as the intersections between the segmented vessel tree and the intermediate circumferences.

Once the method has classified all the vessels within the analysis circumferences and the method obtained the list of connected vessel segments, a voting strategy decides the final category of each vessel. If there is the same number of veins and arteries in a connected list, its vessel segments are not classified.

F.2.c. Experimental Tests and Results

One embodiment of the proposed method was tested using the VICAVR data set in order to characterize its performance. This database includes 58 images centered at the optic disc with the vessel type manually labeled by three experts. The images were acquired from a Cannon CR6-45NM non-mydriatic retinal camera with a resolution of 768×576 pixels. The experts have labeled the same vessel segments detected within five circumferences concentric to the optic disc. The radii of the circumferences are equally spaced and they range from 1.5r to 2.5r, where r is the optic disc radius.

Figure 18:
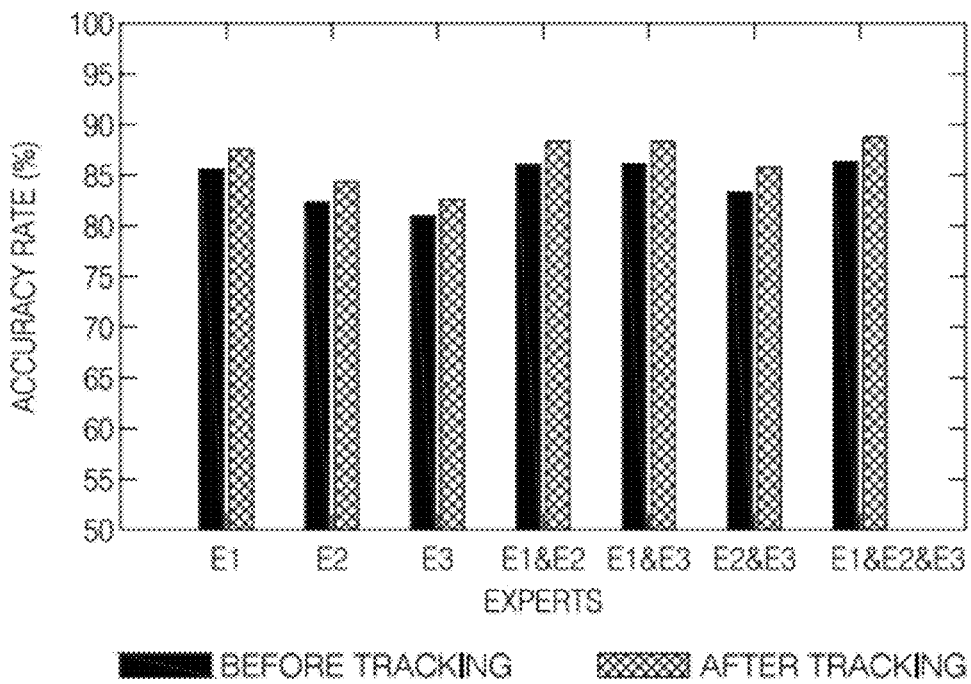
FIG. 18 shows the experimental results of a validation study.
Figure 18:
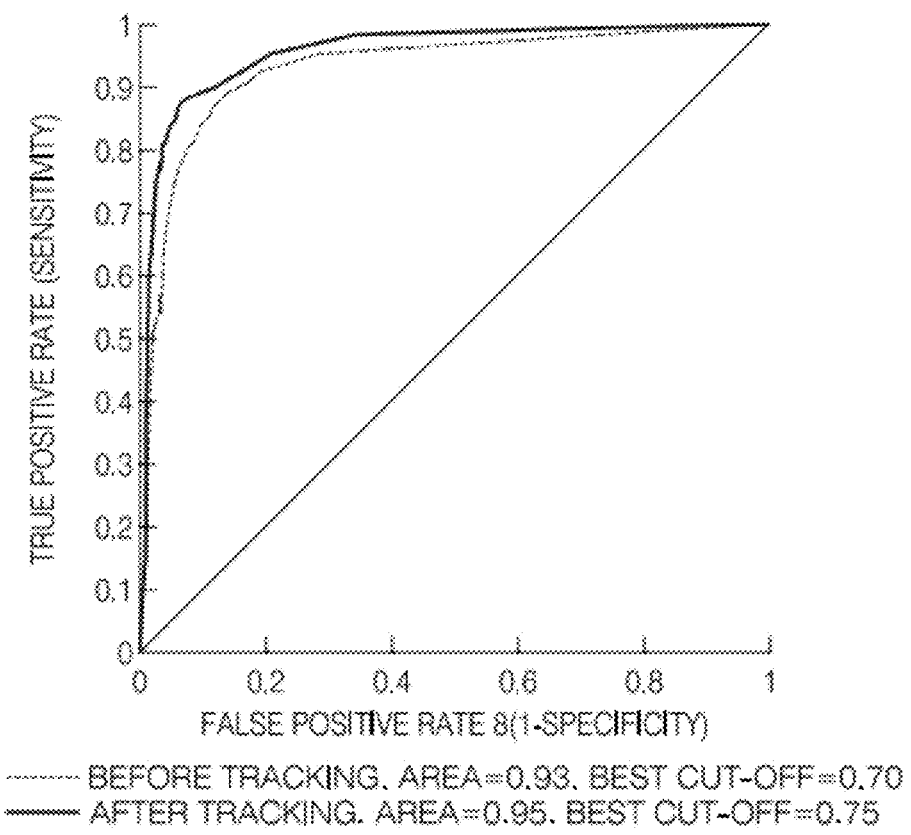

FIG. 18A shows the classification performance in the VICAVR data set in terms of the accuracy rate, after and before applying the vessel tracking method. The "accuracy rate" is the percentage of the vessel segments which have been correctly classified penalized with the vessels unclassified by the system.

$$\text{Accuracy rate} = \frac{n_{corrected\text{-}classifications}}{n_{vessels}} * 100 \quad (34)$$

where $n_{corrected\text{-}classifications}$ is the number of vessel segments, veins and arteries, correctly classified and $n_{vessels}$ is the total number of detected vessel segments that includes the number of vessel segments not classified.

As FIG. 18A shows, the performance is computed with respect to the ground truth obtained from each single expert or the agreement among experts, this is, the number of vessels segments in which the experts agree. Considering the agreement among the three experts as the gold standard, the accuracy rate obtained was 86.34% using only the rotation method and 88.80% including the tracking. If we do not take into account unclassified vessels, the percentage of vessels correctly classified is 87% and 90.08%, before and after applying the tracking method, respectively.

FIG. 18B shows the ROC curve of both classifiers respect to this gold standard. The curve has been computed taking into account different thresholds of the probability to consider a result as positive. An area under the curve of 0.95 with the tracking method against 0.93 without it, indicates a significant improvement in the classification. Additionally, the the tracking algorithm achieves the performance increase with a very little increase in the computation time. The average computation time was 3.2824 seconds in the VICAVR data set (58 images), where 2.1351 seconds were spent in the vessel segmentation and classification and 1.1472 seconds, in the vessel tracking.

While particular embodiments have been described, it is understood that, after learning the teachings contained in this disclosure, modifications and generalizations will be apparent to those skilled in the art without departing from the spirit of the disclosed embodiments. It is noted that the embodiments and examples have been provided merely for the purpose of explanation and are in no way to be construed as limiting. While the method/system/apparatus has been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

The invention claimed is:

1. A method for automatic analysis of a retinal image implemented in a medical system with one or more processors, said method comprising:
   (a) automatically locating an optical disk on said retinal image and establishing a plurality of circumferences;
   (b) automatically detecting a plurality of vessels within a region defined by said circumferences' radii using a crease-based algorithm;
   (c) automatically extracting a plurality of vessel segments based on a deformable models algorithm; and
   (d) automatically classifying said plurality of vessel segments comprising applying a multi-scale retinex enhancement procedure to said retinal image and obtaining a plurality of intensity values corresponding to color components of said vessel segments.

2. The method of claim 1, wherein said automatically classifying said plurality of vessel segments further comprises establishing a plurality of profile lines within said vessel segments to generate a plurality of feature vectors.

3. The method of claim 1, wherein said automatically classifying said plurality of vessel segments further comprises applying a clustering procedure based on said plurality of profile lines.

4. The method of claim 3, wherein said clustering procedure comprises (a) dividing said retinal image into four quadrants, and (b) iteratively rotating the axis of said quadrants by an incremental angle and performing vessel segment clustering for each quadrant based on a K-means algorithm with an arteries cluster and a veins cluster.

5. The method of claim 4, further comprising applying a vessel tracking procedure.

6. The method of claim 5, wherein said vessel tracking procedure is based on a minimal paths method.

7. The method of claim 6, wherein said minimal paths method is computed using a fast marching method.

8. A medical apparatus for automatic retinal image analysis, comprising:
   (a) one or more input hardware elements for operating said medical apparatus;
   (b) a processor configured for (1) automatically locating an optical disk on said retinal image and establishing a plurality of circumferences; (2) automatically detecting a plurality of vessels within a region defined by said circumferences' radii using a crease-based algorithm; (3) automatically extracting a plurality of vessel segments based on a deformable models algorithm; and (4) automatically classifying said plurality of vessel segments comprising applying a multi-scale retinex enhancement procedure to said retinal image and obtaining a plurality of intensity values corresponding to color components of said vessel segments; and
   (c) one or more output hardware elements for displaying the results of said retinal image analysis.

9. The medical apparatus of claim 8, wherein said automatically classifying said plurality of vessel segments further comprises establishing a plurality of profile lines within said vessel segments to generate a plurality of feature vectors.

10. The medical apparatus of claim 8, wherein said automatically classifying said plurality of vessel segments further comprises applying a clustering procedure based on said plurality of profile lines.

11. The medical apparatus of claim 10, wherein said clustering procedure comprises
   (a) dividing said retinal image into four quadrants, and (b) iteratively rotating the axis of said quadrants by an incremental angle and performing vessel segment clustering for each quadrant based on a K-means algorithm with an arteries cluster and a veins cluster.

12. The medical apparatus of claim 11, further comprising applying a vessel tracking procedure.

13. The medical apparatus of claim 12, wherein said minimal paths method is computed using a fast marching method.

* * * * *